US011405820B2

(12) United States Patent
Xi et al.

(10) Patent No.: US 11,405,820 B2
(45) Date of Patent: *Aug. 2, 2022

(54) SHORT PACKET OPTIMIZATION IN WLAN SYSTEMS

(71) Applicant: InterDigital Patent Holdings, Inc., Wilmington, DE (US)

(72) Inventors: Fengjun Xi, San Diego, CA (US); Hanqing Lou, Syosset, NY (US); Oghenekome Oteri, San Diego, CA (US); Nirav B. Shah, San Diego, CA (US); Robert L. Olesen, Huntington, NY (US); Yuan Sheng Jin, Santa Clara, CA (US); Pengfei Xia, San Diego, CA (US); Frank La Sita, Setauket, NY (US); Guodong Zhang, Woodbury, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/450,347

(22) Filed: Jun. 24, 2019

(65) Prior Publication Data
US 2019/0313284 A1 Oct. 10, 2019

Related U.S. Application Data

(63) Continuation of application No. 15/555,686, filed as application No. PCT/US2016/021216 on Mar. 7, 2016, now Pat. No. 10,334,475.
(Continued)

(51) Int. Cl.
H04W 28/06 (2009.01)
H04W 72/12 (2009.01)
(Continued)

(52) U.S. Cl.
CPC .......... *H04W 28/06* (2013.01); *H04L 1/1614* (2013.01); *H04L 1/1621* (2013.01);
(Continued)

(58) Field of Classification Search
CPC ... H04B 7/0404; H04B 7/0452; H04L 1/1614; H04L 1/1621; H04L 1/1861;
(Continued)

(56) References Cited

U.S. PATENT DOCUMENTS 8,582,489 B2 * 11/2013 Kim .......................... H04L 1/06
370/312
8,594,007 B2 * 11/2013 Wentink ................ H04L 1/1854
370/312

(Continued)

FOREIGN PATENT DOCUMENTS

CN 102387008 A 3/2012
WO 2013/141460 9/2013

OTHER PUBLICATIONS

Aboul-Magd, "802.11 HEWSG Proposed PAR," IEEE 802.11-14/0165r0 (Jan. 22, 2014).
(Continued)

Primary Examiner — Ahmed Elallam
(74) Attorney, Agent, or Firm — Volpe Koenig

(57) ABSTRACT

Mechanisms may be used for aggregating acknowledgement (ACK), block ACK (BA) and/or short packets transmissions for multi-user (MU) wireless communication systems. Aggregation mechanisms may be used for uplink (UL) and/or downlink (DL) orthogonal frequency division multiple access (OFDMA), and/or UL/DL multiple-user multiple input multiple output (MU-MIMO) transmissions, for example. Multi-user short packets may be aggregated and/or simultaneously transmitted for DL, UL, or peer-to-peer (P2P) transmissions.

14 Claims, 24 Drawing Sheets

Related U.S. Application Data

(60) Provisional application No. 62/154,577, filed on Apr. 29, 2015, provisional application No. 62/129,561, filed on Mar. 6, 2015.

(51) Int. Cl.

| | | |
|---|---|---|
| *H04L 1/16* | (2006.01) | |
| *H04L 1/18* | (2006.01) | |
| *H04L 5/00* | (2006.01) | |
| *H04B 7/0452* | (2017.01) | |
| *H04W 28/04* | (2009.01) | |
| *H04L 1/00* | (2006.01) | |
| *H04W 84/12* | (2009.01) | |

(52) U.S. Cl.
CPC .......... *H04L 1/1861* (2013.01); *H04L 5/0055* (2013.01); *H04W 28/04* (2013.01); *H04W 72/121* (2013.01); *H04B 7/0452* (2013.01); *H04L 5/0007* (2013.01); *H04L 2001/0093* (2013.01); *H04W 84/12* (2013.01)

(58) Field of Classification Search
CPC ......... H04L 2001/0093; H04L 25/0204; H04L 27/2602; H04L 5/0007; H04L 5/0026; H04L 5/0055; H04L 5/0082; H04L 5/0091; H04W 28/04; H04W 28/06; H04W 72/121; H04W 72/1284; H04W 84/12; H04W 72/1289
See application file for complete search history.

(56) References Cited

U.S. PATENT DOCUMENTS

| | | | | |
|---|---|---|---|---|
| 8,982,758 | B2* | 3/2015 | Gong | H04L 1/1614 370/312 |
| 9,131,395 | B2* | 9/2015 | Amini | H04B 7/0452 |
| 9,634,811 | B2 | 4/2017 | Gong et al. | |
| 9,729,214 | B2 | 8/2017 | Chu et al. | |
| 9,825,678 | B2 | 11/2017 | Chu et al. | |
| 9,854,606 | B2* | 12/2017 | Seok | H04W 74/04 |
| 9,917,679 | B2* | 3/2018 | Seok | H04L 5/0037 |
| 9,961,510 | B2 | 5/2018 | Merlin et al. | |
| 10,045,369 | B2* | 8/2018 | Li | H04L 5/0055 |
| 10,128,925 | B2* | 11/2018 | Chun | H04L 1/0643 |
| 10,230,497 | B2* | 3/2019 | Merlin | H04W 72/005 |
| 10,243,714 | B2* | 3/2019 | Gong | H04W 72/0453 |
| 10,299,261 | B2* | 5/2019 | Chun | H04L 5/0064 |
| 10,305,638 | B2* | 5/2019 | Ahn | H04W 72/0413 |
| 10,334,007 | B2* | 6/2019 | Chun | H04L 5/14 |
| 10,334,475 | B2* | 6/2019 | Xi | H04W 28/06 |
| 10,432,381 | B2* | 10/2019 | Kim | H04L 5/0055 |
| 10,516,519 | B2* | 12/2019 | Seok | H04L 5/0091 |
| 10,542,557 | B2* | 1/2020 | Rong | H04W 72/1268 |
| 10,575,280 | B2* | 2/2020 | Chun | H04L 1/1861 |
| 10,608,832 | B2* | 3/2020 | Huang | H04L 1/1858 |
| 10,674,483 | B2* | 6/2020 | Shinohara | H04W 72/04 |
| 10,785,772 | B2* | 9/2020 | Chun | H04L 5/0053 |
| 10,819,471 | B2* | 10/2020 | Merlin | H04L 1/009 |
| 2010/0220678 | A1 | 9/2010 | Wentink | |
| 2011/0090855 | A1 | 4/2011 | Kim | |
| 2011/0222458 | A1* | 9/2011 | Wu | H04W 72/121 370/312 |
| 2011/0235593 | A1 | 9/2011 | Gong et al. | |
| 2012/0057471 | A1 | 3/2012 | Amini et al. | |
| 2012/0106531 | A1* | 5/2012 | Seok | H04W 52/346 370/338 |
| 2012/0314697 | A1* | 12/2012 | Noh | H04L 1/1628 370/338 |
| 2013/0301569 | A1 | 11/2013 | Wang et al. | |
| 2014/0233551 | A1 | 8/2014 | Wentink et al. | |
| 2015/0043482 | A1 | 2/2015 | Choi et al. | |
| 2015/0146654 | A1* | 5/2015 | Chu | H04L 1/1621 370/329 |
| 2016/0080115 | A1* | 3/2016 | Josiam | H04L 1/1854 370/329 |
| 2016/0087775 | A1* | 3/2016 | Hedayat | H04L 1/12 370/329 |
| 2016/0128057 | A1* | 5/2016 | Seok | H04L 1/0045 370/329 |
| 2016/0174102 | A1* | 6/2016 | Asterjadhi | H04W 28/065 370/389 |
| 2016/0227599 | A1 | 8/2016 | Lee et al. | |
| 2016/0316472 | A1 | 10/2016 | Kwon | |
| 2017/0078070 | A1 | 3/2017 | Gong et al. | |
| 2017/0078107 | A1 | 3/2017 | Itagaki et al. | |
| 2017/0171878 | A1* | 6/2017 | Chun | H04B 7/0404 |
| 2017/0279864 | A1* | 9/2017 | Chun | H04L 65/4076 |
| 2017/0280359 | A1 | 9/2017 | Dong | |
| 2017/0338867 | A1 | 11/2017 | Chu et al. | |
| 2017/0338931 | A1* | 11/2017 | Kim | H04L 5/0055 |
| 2017/0359159 | A1* | 12/2017 | Kim | H04L 5/0055 |
| 2017/0366321 | A1* | 12/2017 | Kim | H04L 1/1614 |
| 2018/0027447 | A1 | 1/2018 | Suzuki et al. | |
| 2018/0034595 | A1* | 2/2018 | Kim | H04L 1/1614 |
| 2018/0076860 | A1 | 3/2018 | Chu et al. | |
| 2018/0097549 | A1 | 4/2018 | Kwon | |
| 2018/0124826 | A1* | 5/2018 | Seok | H04W 74/04 |
| 2018/0175990 | A1* | 6/2018 | Seok | H04L 5/0028 |
| 2018/0227957 | A1 | 8/2018 | Lou et al. | |
| 2018/0310330 | A1* | 10/2018 | Chun | H04L 5/0091 |
| 2019/0158158 | A1* | 5/2019 | Li | H04L 1/1861 |
| 2019/0261224 | A1* | 8/2019 | Ma | H04L 1/1607 |

OTHER PUBLICATIONS

Aboul-Magd, "IEEE 802.11 HEWSG Proposed CSD," IEEE 802.11-14/0169r0 (Jan. 22, 2014).

Adachi et al., "Consideration on UL-MU overheads," IEEE 802.11-15/0064r1 (Jan. 12, 2015).

Azizi et al., "OFDMA Numerology and Structure," IEEE 802.11-15/0330r0 (Mar. 9, 2015).

Azizi et al., "OFDMA Numerology and Structure," IEEE 802.11-15/0330r5 (May 13, 2015).

Chen et al., "MAC and PHY Proposal for 802.11af," IEEE 802.11-10/0258r0 (Mar. 2010).

Draft Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Enhancements for Very High Throughput for Operation in Bands below 6GHz, IEEE P802.11ac/D1.0 (May 2011).

Halasz, "Sub 1 GHz license-exempt PAR and 5C," IEEE P802.11 Wireless LANs, IEEE 802.11-10/0001r13 (Jul. 2010).

Hedayat et al., "DL OFDMA Performance and ACK Multiplexing," IEEE 802.11-15/379r1 (Mar. 9, 2015).

Hedayat et al., "On MU Aggregation Mechanisms for 11ax," IEEE 802.11-14/1232r1 (Sep. 15, 2014).

IEEE P802.11ah/D5.0, Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 6: Sub 1 GHz License Exempt Operation, IEEE P802.11ah/D5.0 (Mar. 2015).

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2012 (Mar. 29, 2012).

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 8: Medium Access Control (MAC) Quality of Service Enhancements, IEEE Std. 802.11e-2005 (Nov. 2005).

IEEE Standard for Information Technology—Telecommunications and information exchange between systems—Local and metropoli-

(56) References Cited

OTHER PUBLICATIONS tan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).

Kim et al., "Further Considerations on Multi-STA Block ACK," IEEE 802.11-15/0626r1 (May 11, 2015).

Li et al., "Multi-User Block ACK Request (MU-BAR)," IEEE 802.11-15/1053 (Sep. 11, 2015).

Lv et al., "Frame Exchange Control for Uplink Multi-user Transmission," IEEE 802.11-14/1190r0 (Sep. 2014).

Merlin et al., "Multi-STA Acknowledgement," 802.11-15/0366r1 (Mar. 9, 2015).

Park, "Proposed Specification Framework for TGah," IEEE 802.11-11/1137r6 (Mar. 12, 2012).

Perahia et al., "HEW Usage Scenarios and Applications," IEEE 802.11-13/0514r0 (May 13, 2013).

Sakoda et al., "Overall Protocol of UL MU BA for Multicast Transmission," IEEE 802.11-15/1043r0 (Sep. 14, 2015).

Stacey, "Specification Framework for TGax," IEEE 802.11-15/0132r15 (Jan. 28, 2016).

Stacey, "Specification Framework for TGax," IEEE 802.11-15/0132r2 (Jan. 15, 2015).

Stacey, "Specification Framework for TGax," IEEE 802.11-15/0132r8 (Sep. 22, 2015).

Wang et al., "Multi-STA BA for SU Transmissions," IEEE 802.11-15/0567r0 (May 2015).

Wong et al., "Proposed TGah Draft Amendment," IEEE 802.11-13/0500r1 (May 13, 2013).

Yang et al., "Cascading Structure," IEEE 802.11-15/0841r0 (Jul. 12, 2015).

Huawei, "Further clarification on the identified parameters for UE throughput estimation in WLAN," 3GPP TSG-RAN3 Meeting #87, R3-150026, Athens, Greece (Feb. 9-13, 2015).

\* cited by examiner

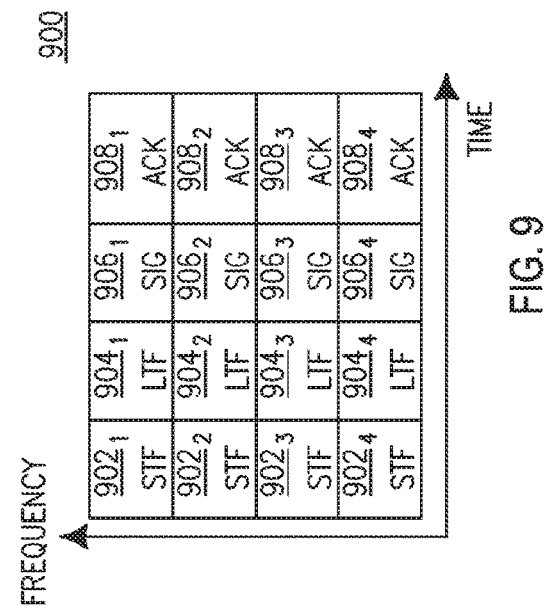
FIG. 8
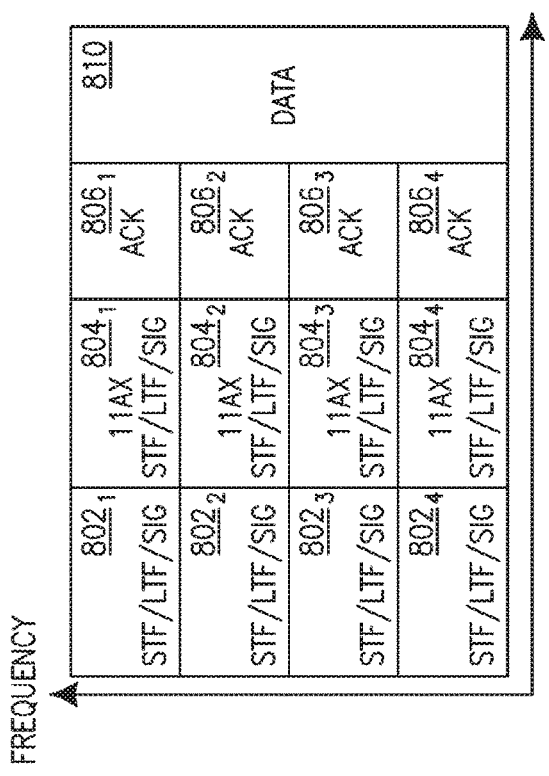
FIG. 9
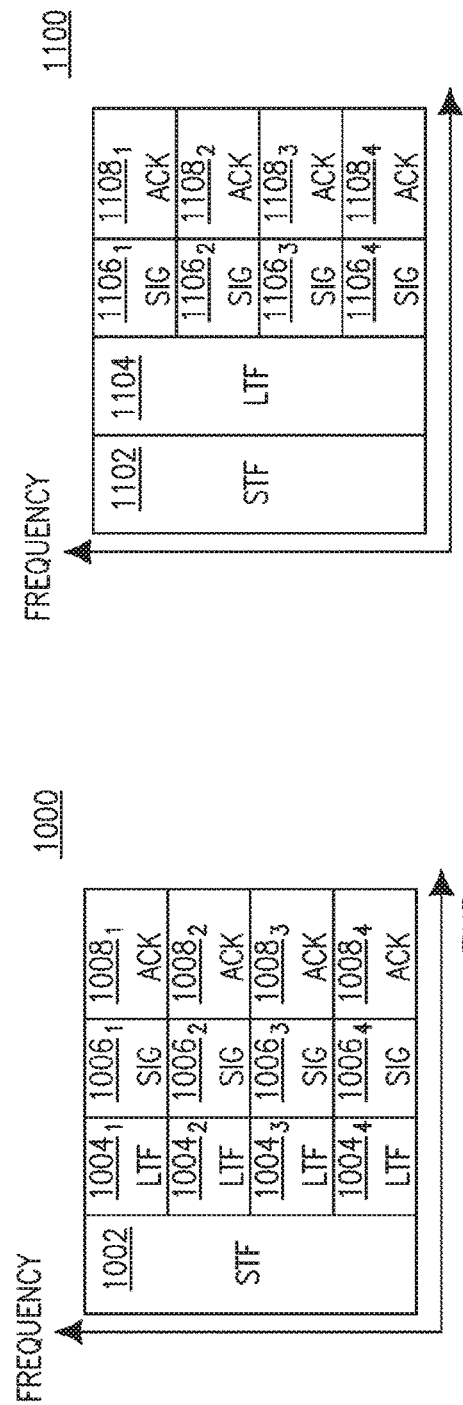
FIG. 10
FIG. 11

FIG. 14

| FRAME CONTROL | DURATION | RA | TA | AAR CONTROL | PER TID CONTROL | SSC | FCS |
|---|---|---|---|---|---|---|---|

| FRAME CONTROL | DURATION | RA | TA | AA CONTROL | SSC | AA BITMAP | FCS |
|---|---|---|---|---|---|---|---|

| FRAME CONTROL | DURATION | RA | TA | BA CONTROL | AA CONTROL | SSC | BA/AA BITMAP | FCS |
|---|---|---|---|---|---|---|---|---|

| NDP INDICATOR (2202) | NDP MAC FRAME TYPE (2204) | MU MODE (2206) | AP ADDRESS (2208) | DURATION (2210) | BW (2212) | MORE DATA (2214) | NDP SIG-B PRESENT (2216) | RESERVED (2218) |

| PAID (2302) | ACK (2304) | RESERVED (2306) |

| STF (2402) | LTF1 (2404₁) | SIG1 (2406₁) | LTF2 (2404₂) | SIG2 (2406₂) | ... | LTFn (2404ₙ) | SIGn (2406ₙ) | ACK1 (2408₁) | ACK2 (2408₂) | ... | ACKn (2408ₙ) |

SHORT PACKET OPTIMIZATION IN WLAN SYSTEMS

CROSS REFERENCE TO RELATED APPLICATIONS

This application is a continuation of U.S. patent application Ser. No. 15/555,686, filed Sep. 5, 2017, which claims the benefit of U.S. National Stage, under 35 U.S.C. § 371, of International Application No. PCT/US2016/021216, filed Mar. 7, 2016, which claims the benefit of U.S. Provisional Application No. 62/129,561, filed Mar. 6, 2015, and U.S. Provisional Application No. 62/154,577, filed Apr. 29, 2015, the contents of which are hereby incorporated by reference herein.

BACKGROUND

A wireless local area network (WLAN) in an Infrastructure Basic Service Set (BSS) mode may include an Access Point (AP) for the BSS and one or more wireless transmit/receive units (WTRUs) (e.g., stations (STAs)) associated with the AP. The AP may have access and/or an interface to a Distribution System (DS) or another type of wired and/or wireless network that may carry traffic in and out of the BSS. Traffic to WTRUs that originates from outside the BSS may arrive through the AP and may be delivered to the WTRUs. Traffic originating from WTRUs in the BSS and intended for destinations outside the BSS may be sent to the AP to be delivered to the respective destinations. Traffic between WTRUs within the BSS may be sent through the AP where the source WTRU may send traffic to the AP and the AP may deliver the traffic to the destination WTRU, for example. Such traffic between WTRUs within a BSS may be referred to as peer-to-peer traffic. Such peer-to-peer traffic may be sent directly between the source and destination WTRUs, for example with a direct link setup (DLS) using an Institute for Electrical and Electronic Engineers (IEEE) 802.11e DLS or an IEEE 802.11z tunneled DLS (TDLS). A WLAN using an Independent BSS (IBSS) mode may not include an AP, and may include WTRUs communicating directly with each other. This mode of communication may be referred to as an "ad-hoc" mode of communication.

SUMMARY

Mechanisms may be used for aggregating acknowledgement (ACK), block ACK (BA) and/or short packets transmissions for multi-user (MU) wireless communication systems. Aggregation mechanisms may be used for uplink (UL) and/or downlink (DL) orthogonal frequency division multiple access (OFDMA), and/or UL/DL multiple-user multiple input multiple output (MU-MIMO) transmissions, for example. Multi-user short packets may be aggregated and/or simultaneously transmitted for DL, UL, or peer-to-peer (P2P) transmissions.

BRIEF DESCRIPTION OF THE DRAWINGS

A more detailed understanding may be had from the following description, given by way of example in conjunction with the accompanying drawings wherein:

FIG. 8 shows a frame format of an example code domain multiplexed UL ACK frame;

FIG. 9 shows a header format of an example grid-based time/frequency domain approach for an UL ACK header;

FIG. 10 shows a header format of another example grid-based time/frequency domain approach for an UL ACK header;

FIG. 11 shows a header format of another example grid-based time/frequency domain approach for an UL ACK header;

FIG. 14 shows a frame format of an example aggregation ACK request (AAR) control frame;

FIG. 15 shows a frame format of an example aggregated ACK (AA) response frame;

FIG. 16 shows a frame format of an example block ACK (BA) AA response frame;

FIG. 22 shows a frame format of an example high-efficiency (HE)-SIG-A field;

FIG. 23 shows a frame format of an example HE-SIG-B field;

FIG. 24 shows a frame format of an example DL ACK MU aggregation header;

DETAILED DESCRIPTION

Figure 1A:
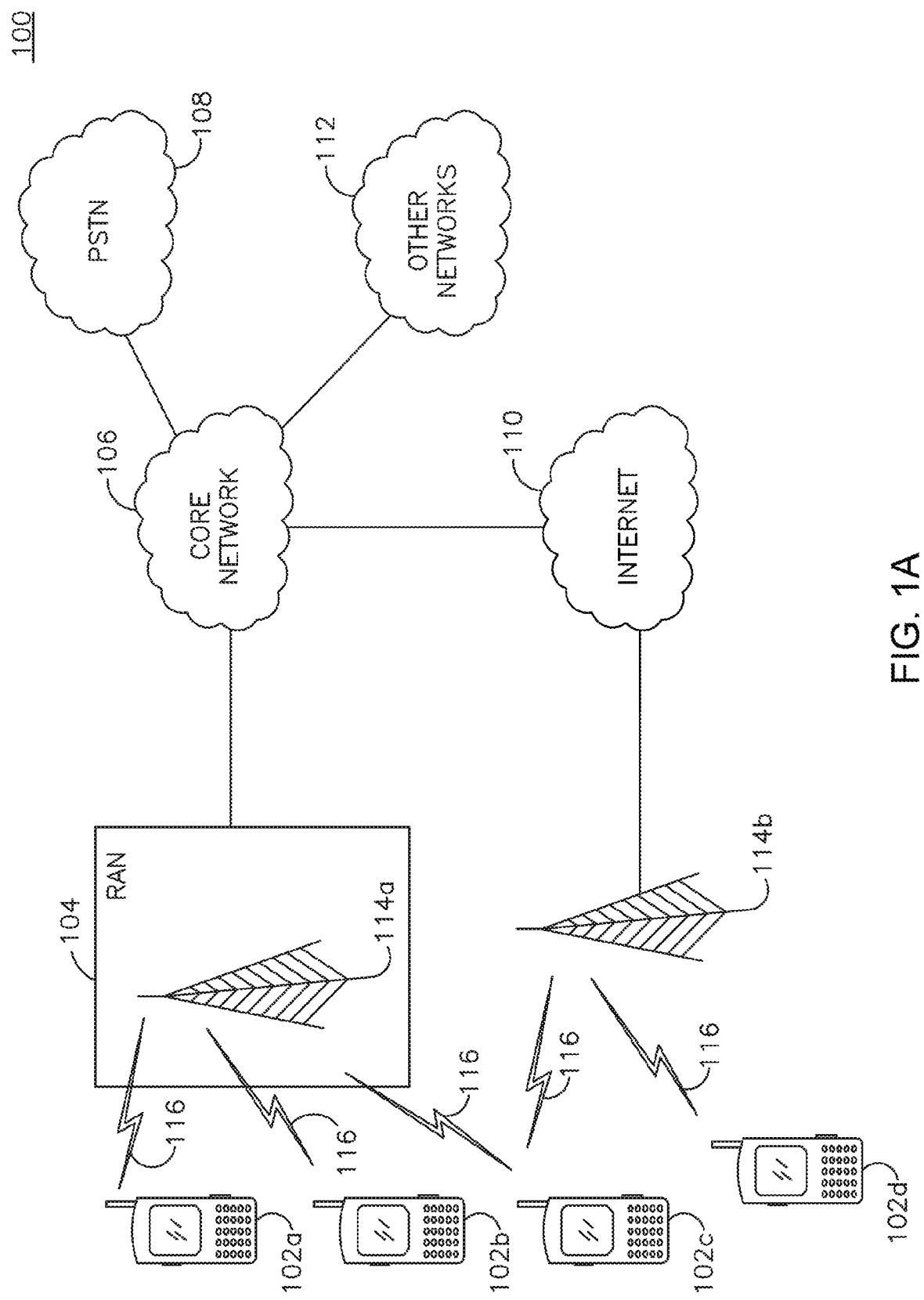
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the other networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple-output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
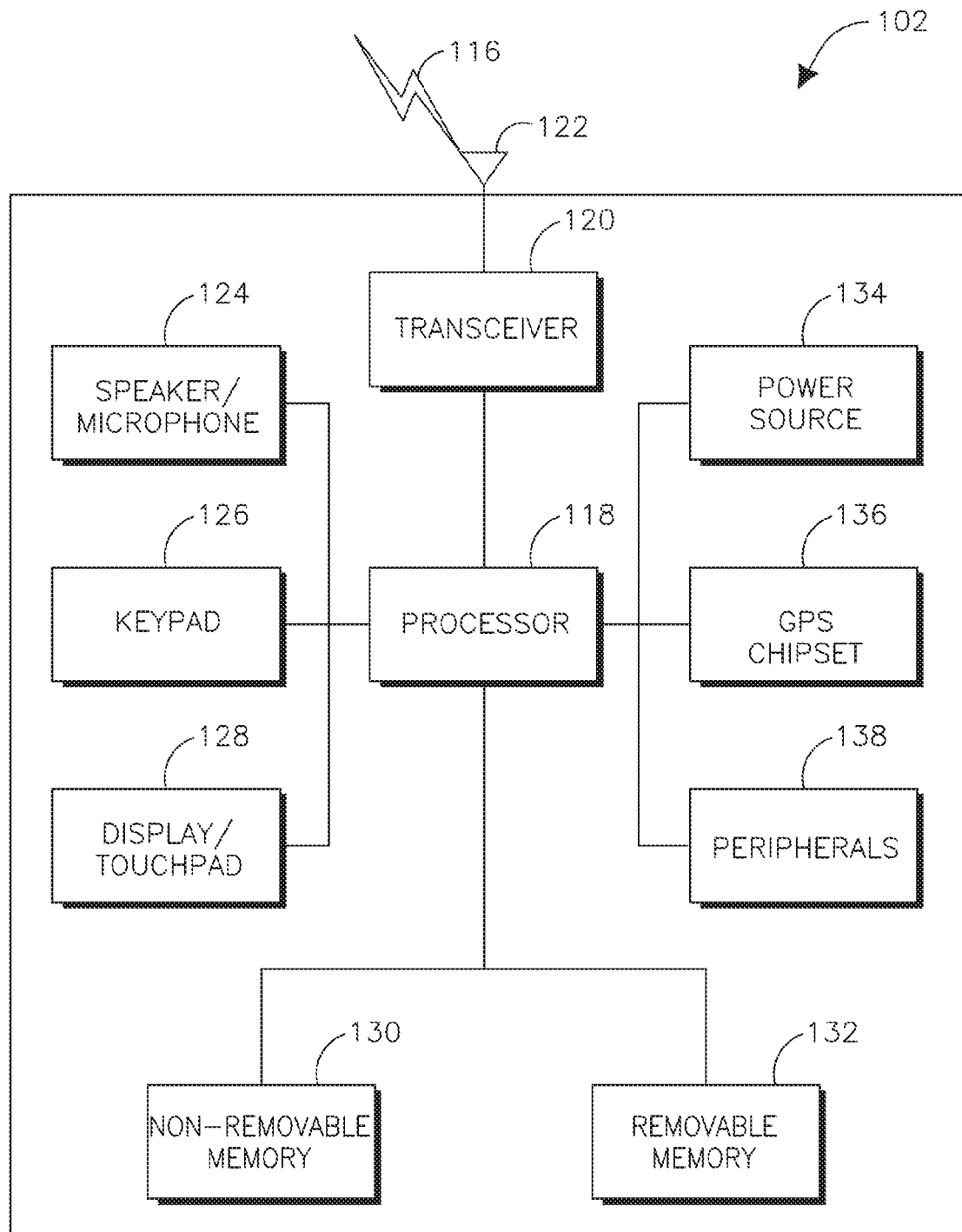
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any subcombination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NIMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
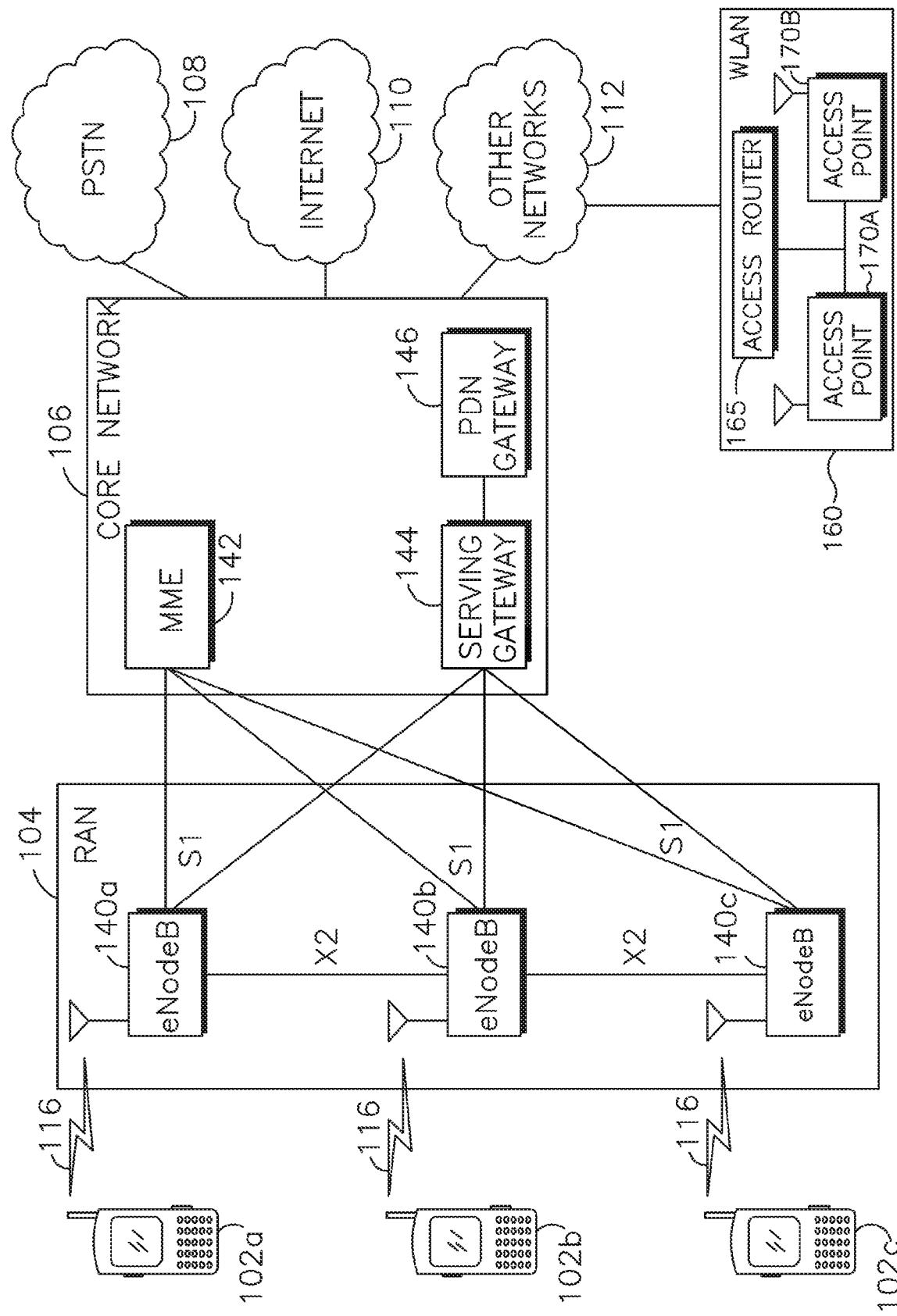
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management entity gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 140a, 140b, 140c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Other network 112 may further be connected to an IEEE 802.11 based wireless local area network (WLAN) 160. The WLAN 160 may include an access router 165. The access router may contain gateway functionality. The access router 165 may be in communication with a plurality of access points (APs) 170a, 170b. The communication between access router 165 and APs 170a, 170b may be via wired Ethernet (IEEE 802.3 standards), or any type of wireless communication protocol. AP 170a is in wireless communication over an air interface with WTRU 102d. In the following, WTRU, user, and station (STA) may be used interchangeably. Similarly, multi-user (MU), multi-WTRU and multi-STA may be used interchangeably. Additionally, channel(s), sub-channel(s), and resource unit(s) (RUs) may be used interchangeably. Any of the mechanisms described herein may be used for acknowledgment (ACK) and/or block ACK (BA) and or negative ACK (NAK) elements or frames, control frames, and/or any type of short frame including short data and/or control frames.

A WLAN in an Infrastructure Basic Service Set (BSS) mode may include an AP for the BSS and one or more WTRUs (e.g., stations (STAs)) associated with the AP. The AP may have access or interface to a Distribution System (DS) or another type of wired and/or wireless network that carries traffic into and out of the BSS. In an example, using an Institute of Electrical and Electronics Engineers (IEEE) 802.11ac infrastructure mode of operation, an AP may transmit a beacon on a fixed channel, which may be the primary channel. This channel may be 20 Megahertz (MHz) wide, and may be the operating channel of the BSS. This channel may be used by the WTRUs to establish a connection with the AP. The fundamental channel access mechanism in an IEEE 802.11 system may be Carrier Sense Multiple Access (CSMA) with Collision Avoidance (CSMA/CA). In a CSMA/CA mode of operation, every WTRU, including the AP, may sense the primary channel. If a WTRU detects that the channel is busy, the WTRU may back off, such that only one WTRU may transmit at any given time in a given BSS.

According to the IEEE 802.11n specification, High Throughput (HT) WTRUs may use a 40 MHz wide channel for communication. This may be achieved, for example, by combining the primary 20 MHz channel with an adjacent 20 MHz channel to form a 40 MHz wide contiguous channel.

According to the IEEE 802.11ac specification, Very High Throughput (VHT) WTRUs may support 20 MHz, 40 MHz, 80 MHz, and/or 160 MHz wide channels. For example, the 40 MHz and 80 MHz channels may be formed by combining contiguous 20 MHz channels similar to the IEEE 802.11n specification described above. A 160 MHz channel may be formed by combining eight contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) and time domain processing may be done on each of the two streams separately. The streams may then be mapped on to the two channels, and the data may be transmitted. At the receiver, this mechanism may be reversed, and the combined data may be sent to the medium access control (MAC) layer.

Sub-1 GHz modes of operation may be supported by the IEEE 802.11af and IEEE 802.11ah specifications. For the IEEE 802.11af and IEEE 802.11ah specifications, the channel operating bandwidths and/or carriers may be reduced relative to those used in IEEE 802.11n and IEEE 802.11ac, for example. The IEEE 802.11af mode of operation may support 5 MHz, 10 MHz and/or 20 MHz bandwidths in the television (TV) White Space (TVWS) spectrum, and IEEE 802.11ah may support 1 MHz, 2 MHz, 4 MHz, 8 MHz, and/or 16 MHz bandwidths using non-TVWS spectrum. An example use case for IEEE 802.11ah may be to support Meter Type Control (MTC) devices in a macro coverage area. MTC devices may have limited capabilities including support for limited bandwidths, and may be designed for a very long battery life.

WLAN systems that support multiple channels and channel widths, such as IEEE 802.11n, IEEE 802.11ac, IEEE 802.11af, and IEEE 802.11ah, may include a channel that is designated as the primary channel. In an example, the primary channel may have a bandwidth equal to the largest common operating bandwidth supported by all WTRUs in the BSS. The bandwidth of the primary channel may therefore be limited by the bandwidth supported by the WTRU in a BSS that supports the smallest bandwidth operating mode, for example.

For example, in an IEEE 802.11ah BSS, the primary channel may be 1 MHz wide if the BSS includes WTRUs (e.g., MTC type devices) that only support a 1 MHz mode. This may be the case even if the AP and/or other WTRUs in the BSS support 2 MHz, 4 MHz, 8 MHz, 16 MHz, or greater channel bandwidth operating modes. Carrier sensing and/or network allocation vector (NAV) settings may depend on the status of the primary channel. For example, if the primary channel is busy, for example when a WTRU supporting only a 1 MHz operating mode is transmitting to the AP, then the entire available frequency bands may be considered busy even though majority of the available frequency remains idle.

In the United States, the available frequency bands which may be used by IEEE 802.11ah may include 902 MHz to 928 MHz. In Korea, the available frequency bands which may be used by IEEE 802.11ah may include 917.5 MHz to 923.5 MHz. In Japan, the available frequency bands which may be used by IEEE 802.11ah may include 916.5 MHz to 927.5 MHz. In these cases, the total bandwidth available for IEEE 802.11ah may include a bandwidth from 6 MHz to 26 MHz depending on the country code.

To improve spectral efficiency, IEEE 802.11ac may include the concept of downlink Multi-User MIMO (MU-MIMO) transmission to multiple WTRUs in the same symbol's time frame (e.g., during a downlink OFDM symbol). The potential use of downlink MU-MIMO is also being considered for IEEE 802.11ah. In some cases, interference of waveform transmissions to multiple WTRUs may not present a problem for an IEEE 802.11ac BSS because downlink MU-MIMO may use the same symbol timing to multiple WTRUs. However, because some or all WTRUs involved in MU-MIMO transmission with the AP may need to use the same channel or band, the operating bandwidth may be limited to the smallest channel bandwidth that is supported by the WTRUs which are included in the MU-MIMO transmission with the AP.

WLAN systems may use of acknowledgement and/or short packet aggregation mechanisms. Wireless transmissions may be unreliable even though protection mechanisms such as channel coding and interleaving may be used to protect the transmissions. Therefore, mechanisms for the acknowledgement of correct packet reception may be used in WLAN systems. A WTRU/AP that successfully receives a data frame addressed to it may send a positive acknowledgement, known as an ACK, to the sender. If a WTRU/AP transmitting a frame does not receive an ACK within a prescribed amount of time, it may assume that the data frame was not received correctly and may retransmit it. However, not all data frames may or can be acknowledged in this way. The IEEE 802.11 standard may also support a "No ACK" mode where the originator or sender of a data frame may indicate that no acknowledgement (i.e. ACK) is expected from the recipient of the data frame.

Block acknowledgement (BA) is used, for example, in IEEE 802.11e. BA may improve system efficiency by allowing the recipient of multiple frames to transmit a single block ACK to acknowledge a block of data frames. This may reduce overhead since the preambles and headers may only be sent once. Examples of BA approaches include, but are not limited to: Immediate Block ACK and Delayed Block ACK. A short ACK packet format is proposed IEEE 802.11ah that includes only short training fields (STF), long training fields (LTF), and signal fields (SIG).

WLAN systems may use short packet aggregation mechanism. The IEEE 802.11 standards may use single-user (SU) aggregation mechanisms such as aggregated medium access control protocol data unit (AMPDU) and aggregated medium access control service data unit (AMSDU). The IEEE 802.11ac specification includes Downlink (DL) multi-user (MU) multiple-input-multiple-output (MU-MIMO) as a MU aggregation method, such that polled ACKs may be sent individually in the uplink (UL). This approach to DL MU-MIMO may add overhead, especially for shorter packets.

The IEEE 802.11 High Efficiency WLAN (HEW) Study Group (SG) was created to explore the scope and purpose of enhancing the quality of service all users experience for a broad spectrum of wireless users in many usage scenarios including high-density scenarios in the 2.4 GHz and 5 GHz band. The HEW SG is considering new use cases that support dense deployments of APs, WTRUs, and/or associated Radio Resource Management (RRM) technologies. Potential applications for HEW include, but are not limited to: emerging usage scenarios such as data delivery for stadium events; high user density scenarios such as train stations or enterprise/retail environments; evidence for an increased dependence on video delivery; and wireless services for medical applications.

The IEEE Standards board approved a Task Group (TG) for IEEE 802.11ax based on a Project Authorization Request (PAR) and Criteria for Standards Development (CSD) developed in the HEW SG. Via the IEEE 802.11ax Task Group (TGax), it has been determined that measured traffic for a variety of applications, including network applications, may have a high likelihood of including short packets. For example, such applications may include, but are not limited to: virtual office; transmission power control (TPC) ACK; video streaming ACK; device/controller (e.g., mouse, keyboard, and/or game controller); access including probe request and/or response; network selection including probe requests, and/or access network query protocol (ANQP); and/or network management control frames.

IEEE 802.11ax may have MU features that may include UL and/or DL OFDMA, and/or UL and/or DL MU-MIMO. Accordingly, mechanisms described herein may be used for multiplexing DL acknowledgments (ACKs) sent in response to UL MU transmissions. IEEE 802.11 standards may include a large overhead and/or delay for short packet(s) and/or payload(s), and thus solutions described herein may be used to achieve any of the following goals: enhance MAC efficiency; reduce medium access overhead and/or delay for short packets/bursts; provide effective ACK and other potential feedback information aggregation schemes for MU features including DL and UL OFDMA and MU-MIMO; and/or provide effective techniques that allow for simultaneous MU short packet transmissions.

A framework may be provided for IEEE 802.11ax for multi-WTRU (e.g., multi-STA) BA control frame to acknowledge multiple WTRUs after UL MU transmission.

Figure 2:
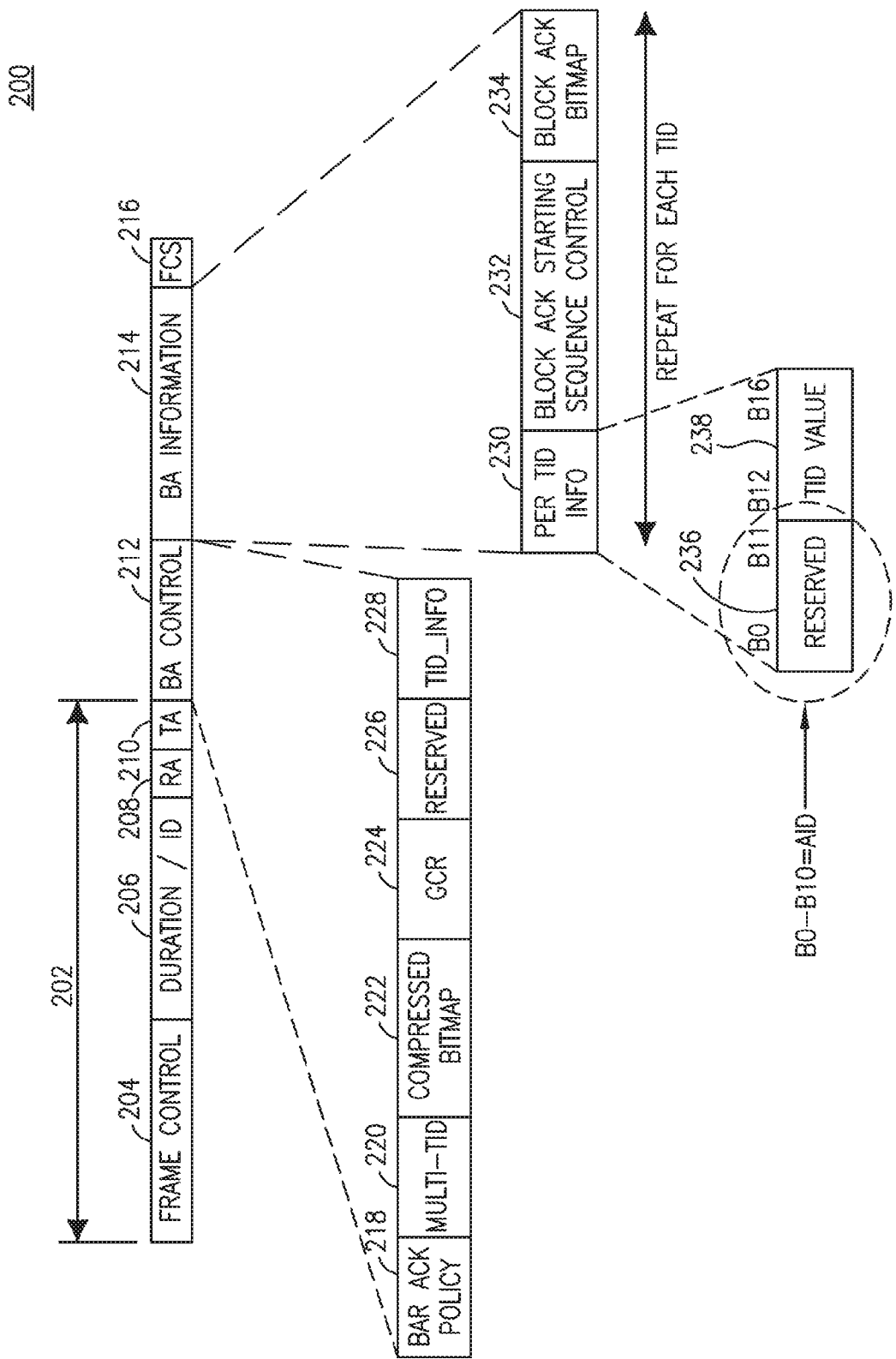
FIG. 2 shows a frame format of an example multi-WTRU block acknowledgment (ACK) (BA) frame.

FIG. 2 shows a frame format of an example multi-WTRU BA frame 200. The multi-WTRU BA frame 200 may be defined by modifying a multi-traffic identifier (multi-TID) BA frame format, for example. The multi-WTRU BA frame 300 may include a MAC header 202. The multi-WTRU BA frame 200 may include, but is not limited to include, any of the following fields: a frame control field 204 (e.g., 2 octets); a duration and/or identification (ID) field 206 (e.g., 2 octets); a receiving WTRU address (RA) field 208 (e.g., 6 octets); a transmitting WTRU address (TA) field 210 (e.g., 6 octets); a BA control field 212 (e.g., 2 octets); a BA information field 214 (e.g., variable length); and/or a frame check sequence (FCS) 216 (e.g., 4 octets). The BA control field 212 may indicate that the frame 200 is a multi-WTRU BA frame. In an example, the BA control field 212 may include 16 bits, B0 to B15. The BA control field 212 may include, but is not limited to include, any of the following subfields: a block acknowledgment request (BAR) ACK policy field 218 (e.g., bit B0); a multi-TID field 220 (e.g., bit B1); a compressed bitmap field 222 (e.g., bit B2); a group code recording (GCR) field 224 (e.g., bit B3); reserved field(s) 226 (e.g., bits B4 to B11); and/or a TID_INFO field 228 (e.g., bits B12-B15).

The BA information field 214 may include information that is repeated for each TID. The repeated information in the BA information field 214 may include, but is not limited to include, any of the following: a per-TID information field 230 (e.g., 2 octets); a BA starting sequence control field 232 (e.g., 2 octets); and/or a BA bitmap field 234 (e.g., 8 octets). Each repeated information for each TID within the BA Information field 214 may be addressed to different WTRU(s). For example, bits B0-B10 of the per-TID information field 230, which may be part of a reserved field 236 (e.g., bits B0-B11), may carry an association identifier (AID) field identifying the intended receiver of the BA Information field 214. The per-TID information field 230 may include a TID value field 238 (e.g bits B12 to B16).

Figure 3:
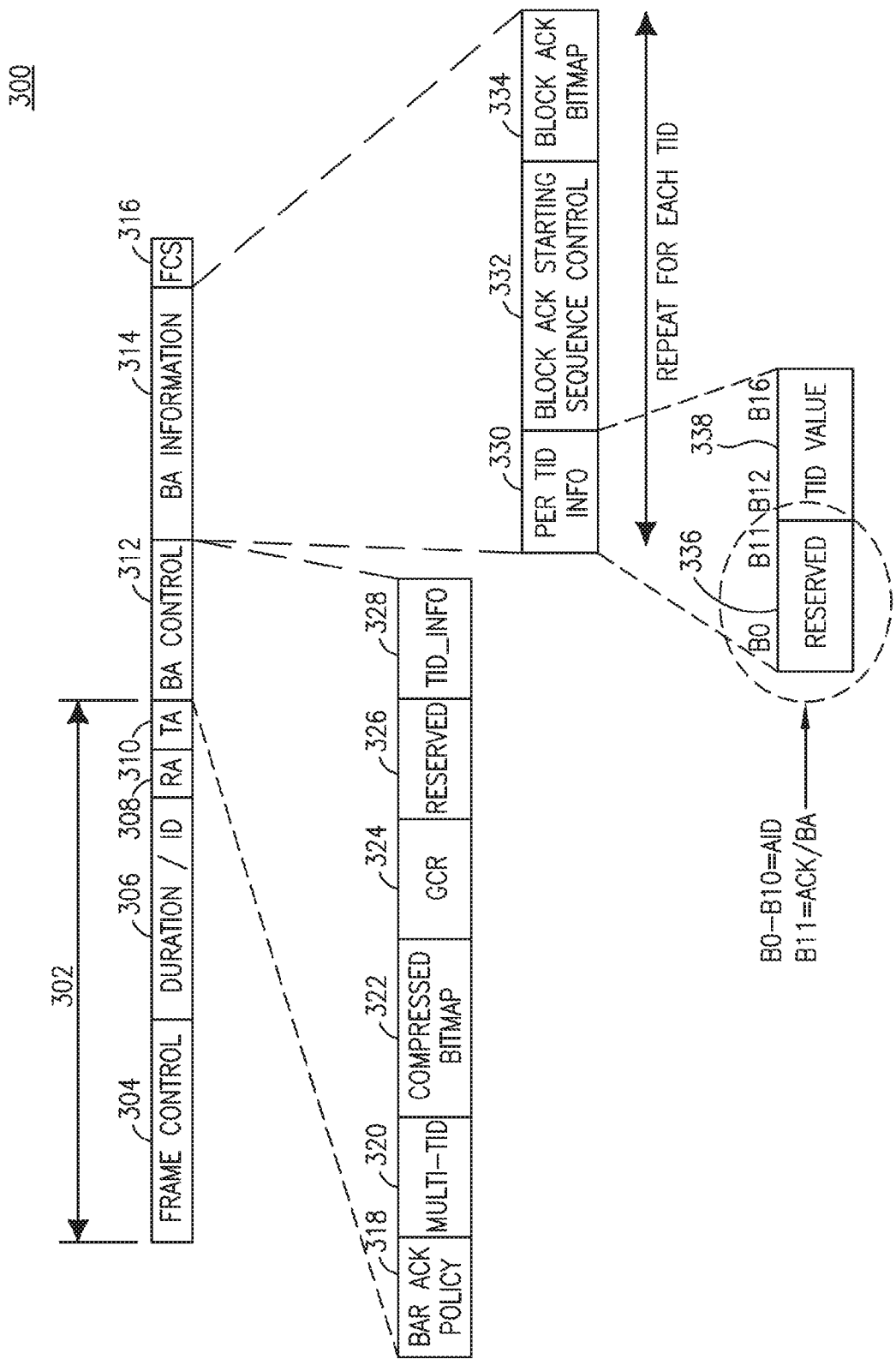
FIG. 3 shows a frame format of another example multi-WTRU BA frame.

FIG. 3 shows a frame format of another example multi-WTRU BA frame 300. The multi-WTRU BA frame 300 may be defined by modifying a multi-TID BA frame format, for example. The multi-WTRU BA frame 300 may include a MAC header 302. The multi-WTRU BA frame 300 may include, but is not limited to include, any of the following fields: a frame control field 304 (e.g., 2 octets); a duration and/or ID field 306 (e.g., 2 octets); an RA field 308 (e.g., 6 octets); a TA field 310 (e.g., 6 octets); a BA control field 312 (e.g., 2 octets); a BA information field 314 (e.g., variable length); and/or an FCS 316 (e.g., 4 octets). The BA control field 312 may indicate that the frame 300 is a multi-WTRU BA frame. In an example, the BA control field 312 may include 16 bits, B0 to B15. The BA control field 312 may include, but is not limited to include, any of the following subfields: a BAR ACK policy field 318 (e.g., bit B0); a multi-TID field 320 (e.g., bit B1); a compressed bitmap field 322 (e.g., bit B2); a GCR field 324 (e.g bit B3); reserved field(s) 326 (e.g., bits B4 to B11); and/or a TID_INFO field 328 (e.g., bits B12-B15).

The BA information field 314 may include information that is repeated for each TID. The repeated information in the BA information field 314 may include, but is not limited to include, any of the following: a per-TID information field 330 (e.g., 2 octets); a BA starting sequence control field 332 (e.g., 2 octets); and/or a BA bitmap field 334 (e.g., 8 octets). The multi-WTRU BA frame 300 may allow an ACK indication per WTRU, in addition to or instead of a BA. In a BA information field 314, if bit B11 in the per-TID info field 330 is set, then the BA bitmap subfield 334 and/or the BA starting sequence control (SC) subfield 332 may not be present in the BA information field 314. In this scenario, the BA information field 314 may indicate an ACK for the WTRU in B11 of the per-TID info field 330 with AID indicated in bits B0 to B10 in the per-TID info field 330. Bits B0-B10 of the per-TID information field 330 may carry an AID field identifying the intended receiver of the BA information field 314. The per-TID information field 330 may include a TID value field 338 (e.g bits B12 to B16).

UL ACK aggregation for DL OFDMA and/or DL MU-MIMO may be used in WLAN systems. A Polled-ACK mechanism, used in IEEE 802.11ac for DL MU MIMO for example, may be used for DL OFDMA for backwards compatibility. However, a polled-ACK mechanism may not be efficient for DL MU technologies as it may create excessive overhead by sending ACKs individually in the UL. Therefore, more efficient mechanisms and procedures may be designed and used for DL OFDMA and/or DL MU-MIMO.

ACK/BA aggregation in the DL direction may not be available in the IEEE 802.11 specifications. For UL MU features in IEEE 802.11 systems, that may include UL OFDMA and/or UL MU-MIMO, mechanisms may be used for multiplexing DL acknowledgments (ACKs) sent in response to UL MU transmissions.

The Multi-WTRU BA control frame formats described in FIGS. 2 and 3 for DL MU BA/ACK aggregation may, or may not, be affected by any of the following considerations: the RA field may not be easily interpreted as a receiver MAC address because multiple receivers (e.g., multiple WTRUs/STAs) may be included in the frame transmission; the BA information subfield length of the BA frame format may be obtained from the TID_INFO subfield in the BA Control field, although the frame format may not allow it; The 9 or 10 bits partial AID in the per-TID info field may cause confusion at the receiver (e.g., WTRU) due to the limited bit length; the length of BA information may be variable since both ACK and BA may be supported, such that a receiver (e.g., WTRU) may be required to decode the entire information in order to obtain the ACK/BA for itself; an indication may be needed to indicate that the frame is a multi-WTRU BA; a multi-TID BAR and/or multi-TID BA may be needed for HT-immediate operation; and/or a BAR/BA protocol may need to be redefined for Multi-WTRU BA.

Short data packets may use MU aggregation in the UL, DL and/or peer-to-peer transmissions in WLAN systems, such as in IEEE 802.11ax networks for example. Measured traffic for a variety of applications, including network applications, may have a high likelihood of including short packets, and certain network applications may also generate short packets. The IEEE 802.11n and 802.11ac specifications may include AMPDUs for single user (SU) aggregation within the same burst, and MU aggregation mechanisms may or may not be used in IEEE 802.11 specifications. In IEEE 802.11 specifications, small packets may face similar amounts of overhead and/or delay as larger packets. Thus, MAC and physical (PHY) layer procedures with parallel transmissions of small packets in code/spatial/frequency/time domain(s) and/or effective mechanisms for simultaneous MU short packet transmission may be used in order to enhance MAC efficiency and reduce medium access overhead and/or delay for short packets.

Similarly, ACK and/or short data packets may be aggregated in DL, UL, and/or peer-to-peer transmissions in WLAN systems (e.g., IEEE 802.11ax networks). Because MU features, including OFDMA and MU-MIMO, may be used for both UL and DL, mechanisms and processes may be used to aggregate control frames, such as ACK and/or short data packets, which in order to enhance MAC efficiency and reduce medium access overhead and/or delay for short packets/bursts and MU features.

IEEE 802.11 MAC designs may be optimized for packet transmissions over large bandwidths. Short packet optimization mechanisms may optimize the reservation of wide channel bandwidths. For example, in IEEE 802.11ac a procedure for reserving bandwidths that are larger than 20 MHz may enhance the use of CTS/RTS frame exchanges to allow a backward compatible reservation of 40 MHz and/or 80 MHz channel bandwidths. IEEE 802.11ac optimizations for small packet transmissions may be used for management frames, such that optimizations for small data packets may be limited.

Example approaches for UL ACK aggregation may include, but are not limited to, any of the following: UL scheduled ACK aggregation; UL ACK aggregation in code domain; UL ACK aggregation in the spatial domain; and/or UL ACK aggregation for DL OFDMA and/or MU-MIMO. These example approaches are discussed in detail below.

According to an example approach, UL scheduled ACK aggregation may be used to reduce overhead and/or delay for DL OFDMA and/or DL-MIMO transmissions. A procedure at an AP may identify WTRUs that are intended for a scheduled response to the AP in order for a group of WTRUs to communicate with their associated AP. Similarly, a WTRU procedure may be used for enabling the scheduled response. Example methods for enabling a scheduled response of an ACK and/or block ACK (BA) from multiple WTRUs to the AP as part of MU ACK aggregation are described herein.

In an example method, for responding to DL OFDMA, and/or DL MU-MIMO data transmission to a group of WTRUs, a control frame may be used to schedule or signal the response procedure for the group of sequential or simultaneous ACKs and/or BAs for UL MU ACK aggregation. For example, the control frame may be sent in an interval of time equal to x short inter-frame spacing (xSIFS) after DL MU data transmission, where x may be 1 or any positive integer.

In another example method, control information may be used to signal the response procedure for a group of scheduled ACKs and/or BAs for UL MU ACK aggregation. For example, the control information may be included by the AP in a DL frame header explicitly and/or implicitly. As an example of explicit control information, the control information indicating group ordering of UL MU ACK aggregation may be included in the DL MU data frame physical layer convergence protocol (PLCP) header transmitted over the entire channel and/or may be included in each dedicated WTRU-specific sub-channel PLCP header. As an example of implicit control information, it may be defined that once the WTRUs have received a DL MU data frame, the corresponding MU ACKs and/or BAs are aggregated and sequentially transmitted as a group in the UL.

In another example method, a management frame may be used to schedule DL MU data transmissions and/or UL MU ACK/BA transmissions. The management frame may be sent in the DL by the AP to carry the scheduling information for subsequent DL and UL transmissions.

The control or management frame may include, but is not limited to include, any of the following information: the number of WTRUs scheduled to feedback the acknowledgement; which group of WTRUs and/or which WTRUs are scheduled to feedback the acknowledgement; by which resource unit the scheduled ACKs and/or BAs for each WTRU should feedback to the AP; whether the ACKs and/or BAs are allowed to be aggregated with other packets such as data and/or control frames; and/or any other scheduling information such as BAR control and/or BAR information for each scheduled WTRU.

In an example scenario, if a WTRU does not detect or successfully demodulate the control or management frame (and thus misses its UL ACK/BA transmission), the AP may detect this within a certain period of time (e.g., point coordination function (PCF) inter-frame spacing (PIFS)) after the control or management frame transmission. If the UL MU ACK/BA transmission time is too long, the AP may resend a recovery control or management frame with a new schedule for the other WTRUs that did not successfully feedback their UL ACKs/BAs. For example, the AP may resend the recovery control or management frame a period of PIFs after the previous control or management frame.

According to an example, WTRUs in a group may respond to a message for the scheduled ACKs and/or BAs as described in one or a combination of the example methods. For example, a group of WTRUS may respond in an interval of time equal to ySIFS, where y may be any positive integer greater than or equal to 1. WTRUs within the group may respond using ACKs and/or BAs sequentially with or without z short inter-frame space (zSIFS), or z reduced inter-frame space (zRIFS), where z may be any positive integer greater than or equal to 1. In a scenario where SIFS or RIFS is not used, the MU ACKs and/or BAs may share the same preamble and/or header.

Figure 4:
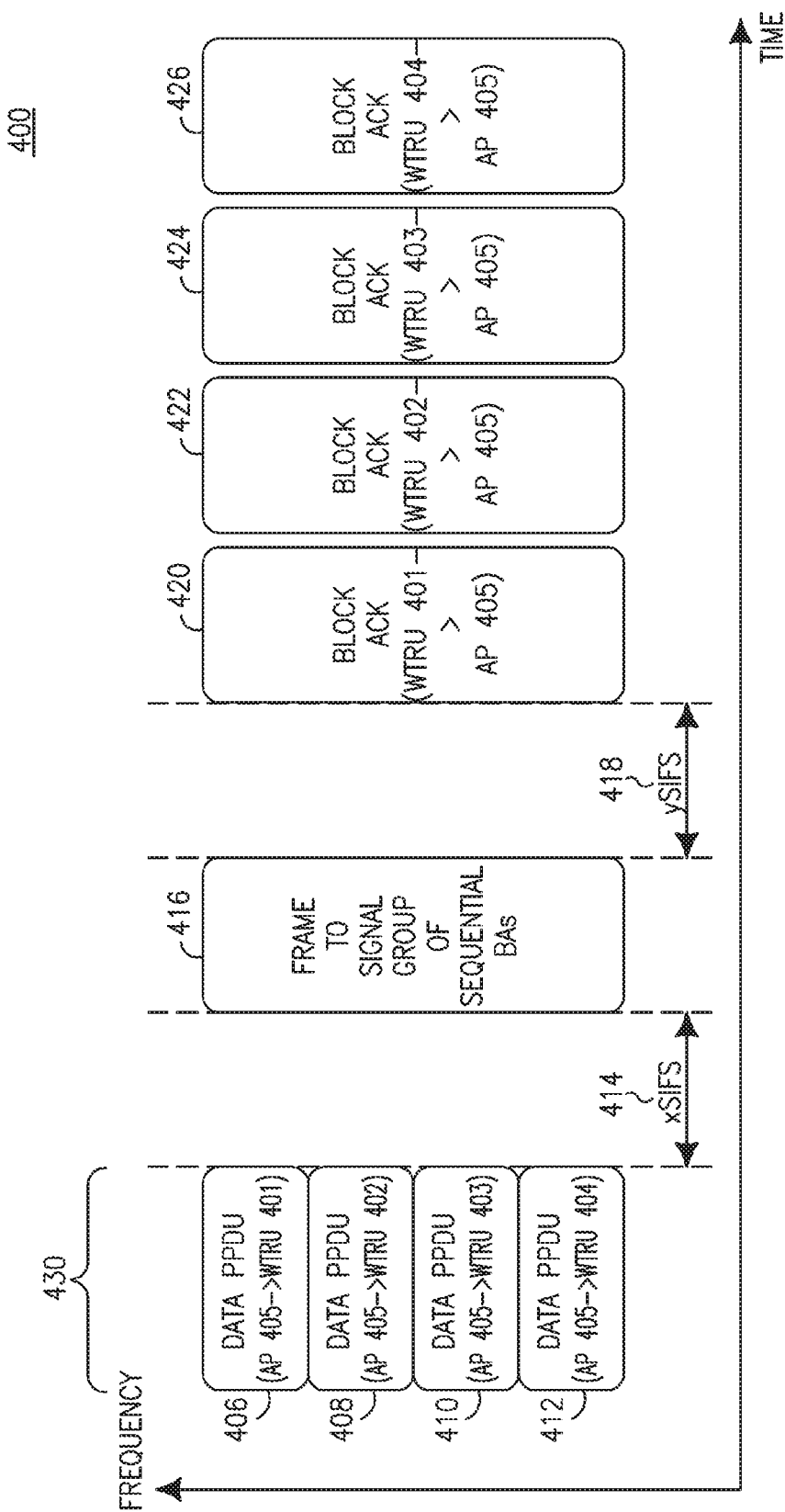
FIG. 4 shows a signaling diagram of an example scheduled channel procedure for sequential ACKs/BAs for downlink (DL) orthogonal frequency division multiple access (OFDMA)

FIG. 4 shows a signaling diagram of an example scheduled channel procedure 400 for sequential ACKs/BAs for DL OFDMA. In the example scenario of FIG. 4, WTRUs 401-404 may be in communication with AP 405. AP 405 may transmit data PLCP protocol data units (PPDUs) 406, 408, 410 and 412 to WTRUs 401, 402, 403, and 404, respectively. The data PPDUs 406, 408, 410 and 412 may be transmitted in parallel over different channel(s), sub-channel(s) or resource units (RUs) in DL OFDMA, for example. Using OFDMA, which is a multi-user variant of the OFDM scheme, multiple-access may be achieved by assigning subsets of subcarriers to different users, allowing simultaneous data transmission by several users. In OFDMA, the resources may be allocated in two dimensional regions over time and frequency. In FIG. 4, the time region may cover the entire data portion of the MU PPDU 430 (including data PPDUs 406, 408, 410, and 412), and in frequency domain, the subcarriers may be divided into several groups of subcarriers where each group may be denoted as a resource unit (RU) or sub-channel that may be allocated for data transmission 406, 408, 410, and 412 to each of the users (WTRUs 401, 402, 403 and 404). The simultaneous data PPDU transmissions 406, 408, 410, and 412 in an MU PPDU 430 in DL OFDMA and/or DL MU MIMO may end at the same time.

The transmission of data PPDUs 406, 408, 410 and 412 may be followed by an interframe spacing xSIFs 414. The AP 405 may send a control frame 416 to the WTRUs 401-404 to schedule or indicate the group of WTRUs (e.g., WTRUs 401-404) that are identified for sequential transmission of ACKs and/or BAs to the AP 405. The control frame 416 may use the entire channel bandwidth, for example. The use of control frame 416 may incur less overhead and/or delay than using a polled ACK approach. Each ACK and/or BA 420, 422, 424, and 426 may be sent sequentially over the entire channel bandwidth to the respective WTRUs 401, 402, 403, and 404, within the group.

Figure 5:
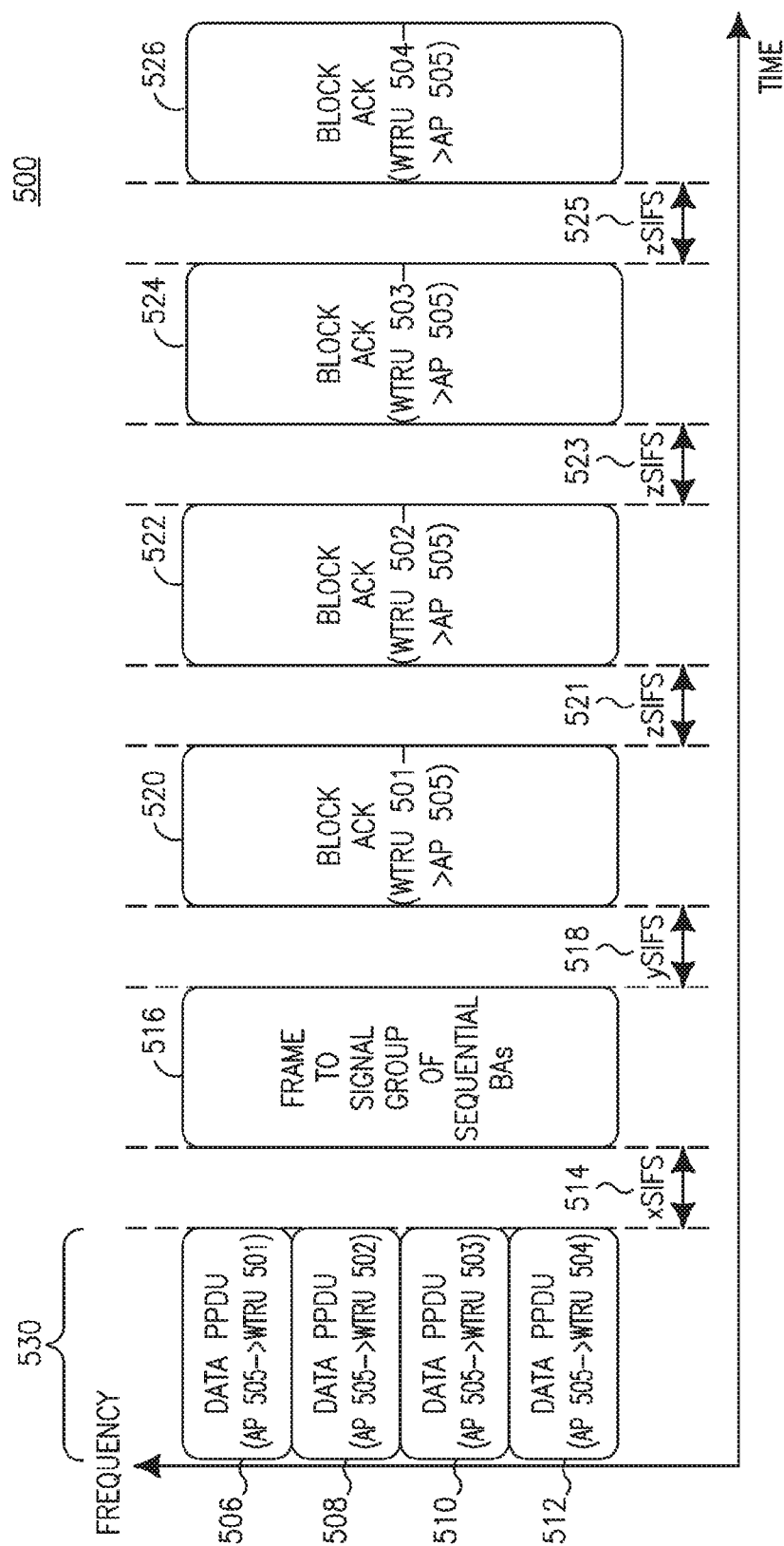
FIG. 5 shows a signaling diagram of another example scheduled channel procedure for sequential ACKs/BAs for DL OFDMA.

FIG. 5 shows a signaling diagram of another example scheduled channel procedure 500 for sequential ACKs/BAs for DL OFDMA. In the example scenario of FIG. 5, WTRUs 501-504 may be in communication with AP 505. AP 405 may transmit data PPDUs 506, 508, 510 and 512 to WTRUs 501, 502, 503, and 504, respectively. The data PPDUs 506, 508, 510 and 512 may be transmitted in parallel over different channel(s) or sub-channel(s) and may be part of MU PPDU 530, for example. The transmission of data PPDUs 506, 508, 510 and 512 may be followed by an interframe spacing xSIFs 514.

The AP 505 may send a control frame 516 to the WTRUs 501-504 to schedule or indicate the group of WTRUs (e.g., WTRUs 501-504) that are identified for sequential transmission of ACKs and/or BAs to the AP 505. The control frame 516 may use the entire channel bandwidth, for example. Each ACK and/or BA 520, 522, 524, and 526 may be sent sequentially over the entire channel bandwidth to the respective WTRUs 501, 502, 503, and 504, within the group. The transmission of the ACK and/or BA 520, 522, 524, and 526 may be separated by ySIFs 518 and/or zSIFS 521, 523 and/or 525, for example.

Figure 6:
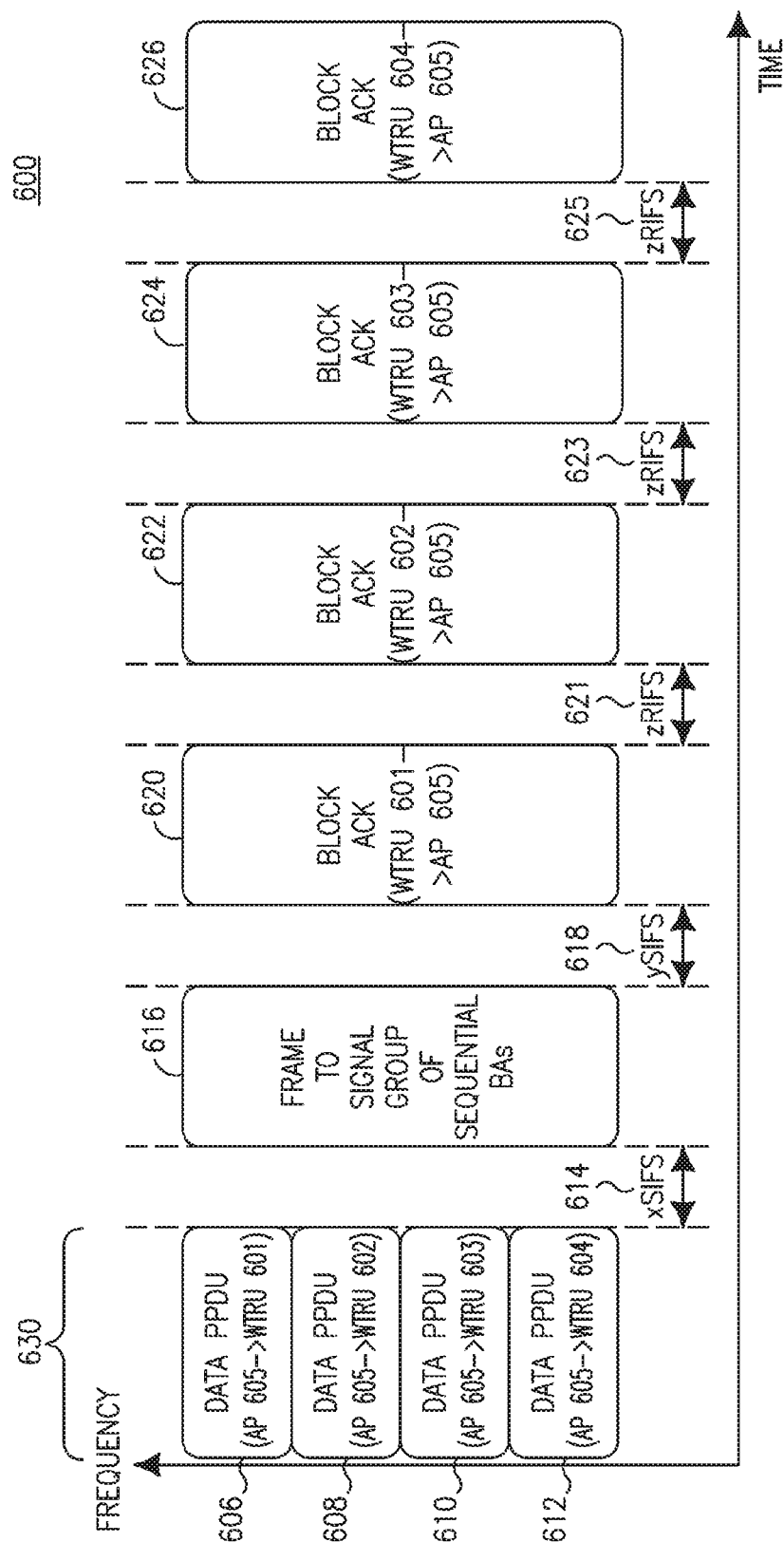
FIG. 6 shows a signaling diagram of another example scheduled channel procedure for sequential ACKs/BAs for DL OFDMA.

FIG. 6 shows a signaling diagram of another example scheduled channel procedure 600 for sequential ACKs/BAs for DL OFDMA. In the example scenario of FIG. 6, WTRUs 601-604 may be in communication with AP 605. AP 605 may transmit data PPDUs 606, 608, 610 and 612 to WTRUs 601, 602, 603, and 604, respectively. The data PPDUs 606, 608, 610 and 612 may be transmitted in parallel over different channel(s) or sub-channel(s) and may be part of MU PPDU 630, for example. The transmission of data PPDUs 606, 608, 610 and 612 may be followed by an interframe spacing xSIFs 614.

The AP 605 may send a control frame 616 to the WTRUs 601-604 to schedule or indicate the group of WTRUs (e.g., WTRUs 601-604) that are identified for sequential transmission of ACKs and/or BAs to the AP 605. The control frame 616 may use the entire channel bandwidth, for example. Each ACK and/or BA 620, 622, 624, and 626 may be sent sequentially over the entire channel bandwidth to the respective WTRUs 601, 602, 603, and 604, within the group. The transmission of the ACK and/or BA 620, 622, 624, and 626 may be separated by ySIFs 618 and/or zRIFS 621, 623 and/or 625, for example. The use of RIFS may reduce the MAC overhead as much as are more than using SIFS.

Figure 7:
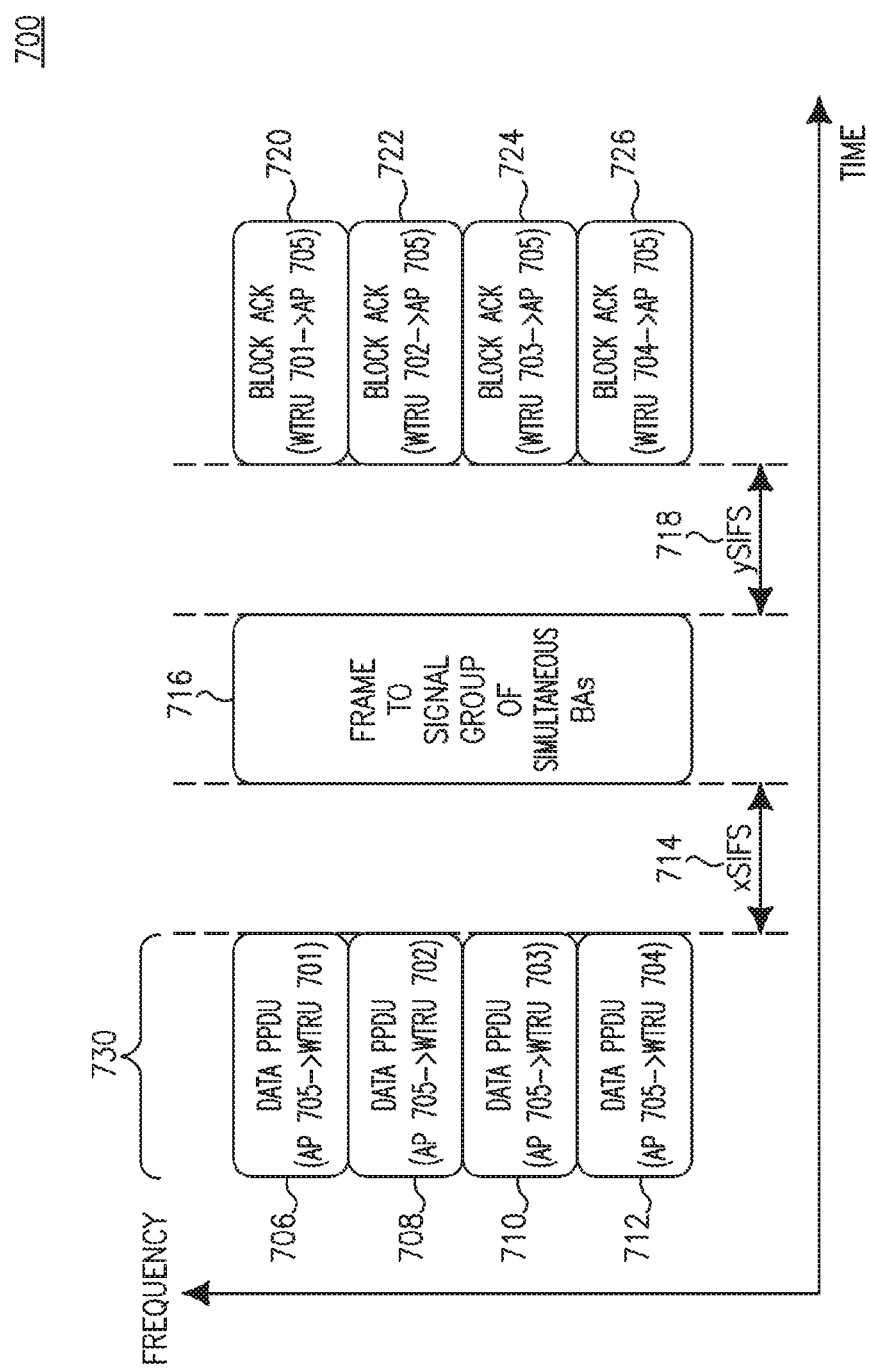
FIG. 7 shows a signaling diagram of another example scheduled channel procedure for simultaneous ACKs/BAs for DL OFDMA over sub-channel(s)

FIG. 7 shows a signaling diagram of another example scheduled channel procedure 700 for simultaneous ACKs/BAs for DL OFDMA over sub-channel(s). In the example scenario of FIG. 7, WTRUs 701-704 may be in communication with AP 705. AP 705 may transmit data PPDUs 706, 708, 710 and 712 to WTRUs 701, 702, 703, and 704, respectively. The data PPDUs 706, 708, 710 and 712 may be transmitted in parallel over different channel(s) or sub-channel(s), and may be part of MU PPDU 730 for example.

The transmission of data PPDUs 706, 708, 710 and 712 may be followed by an interframe spacing xSIFs 714.

The AP 705 may send a control frame 716 to the WTRUs 701-704 to schedule or indicate the group of WTRUs (e.g., WTRUs 701-704) that are identified for (simultaneous) transmission of MU ACKs and/or BAs to the AP 705. The control frame 716 may use the entire channel bandwidth, for example. The control frame 716 may be followed by a ySIFS 714.

As indicated by the control frame 716, the MU ACKs (and/or BAs) 720, 722, 724 and 726 may be simultaneously transmitted from the respective WTRUs 701, 702, 703, and 704 on one or more corresponding sub-channel(s). Scheduled sub-channel based ACKs or BAs, such as MU ACKs (or BAs) 720, 722, 724 and 726, may involve an UL OFDMA capability. The MU ACKs (and/or BAs) 720, 722, 724 and 726 may be equivalently supplemented and/or replaced by orthogonal spatial domain transmission of MU ACKs and/or BAs.

Example mechanisms for CDMA UL ACK aggregation, including UL ACK aggregation in the code domain, are described herein and may be used for DL OFDMA and/or DL MU-MIMO. Such mechanisms may facilitate a tradeoff between feedback overhead, and UL ACK/control frame aggregation efficiency. For the mechanisms described herein, UL ACK aggregation may apply to UL ACK, UL control frame and/or short (data and/or control) frame aggregation.

In an example, a grid-based time and frequency domain solution may be used for UL ACK MU aggregation. MU ACKs and/or BAs may be simultaneously sent on the same time and frequency grid by using code domain codes or sequences. Because DL OFDMA and/or DL MU-MIMO may be used, up to sixteen simultaneous UL ACKs may be used to support four downlink streams on four downlink sub-channels, for example.

In an example, an UL MU ACK channel may be divided into one, two, or four uplink sub-channels where the sub-channels may be uniquely defined for the UL ACK, or associated UL management frame channel. For example, in the case that an UL channel bandwidth is 20 MHz (e.g., in IEEE 802.11ac), the one, two, or four UL sub-channels may each have a bandwidth of 20, 10, or 5 MHz, respectively, using a 256 point FFT for the 20 MHz channel. Other combinations of sub-channel(s) and bandwidth(s) may be used. OFDMA UL channel configurations may support up to four simultaneous UL ACKs in a 20 MHz channel, for example.

The complexity of a spreading code approach may increase linearly with bandwidth, while the complexity of an OFDM approach may increase logarithmically with bandwidth. Thus, a spreading code approach may be implemented over a smaller bandwidth than the maximum channel bandwidth of the data channel in WLAN to reduce complexity. Furthermore, a spreading code may be applied to each of the UL ACK sub-channels discussed above (e.g., the sub-channels used for the MU ACKs and/or BAs 720, 722, 724, and 726 in FIG. 7). For example, up to four orthogonal spreading codes may be defined for four UL 5 MHz sub-channels (or channels), where each spreading code may represent an ACK for one of up to sixteen WTRUs in an UL OFDMA channel. The four UL 5 MHz sub-channels, each with up to four spreading codes, may be defined as a control sub-frame that may occur prior to the data sub-frame(s). The subsequent data sub-frame(s) may have a bandwidth that is greater than the bandwidth of the ACK (or control frame) sub-channels (e.g., 20 MHz>5 MHz).

In the examples of FIGS. 8-10, it may be assumed that there are four sub-channels (but it may apply to any number of sub-channels).

FIG. 8 shows a frame format of an example code domain multiplexed UL ACK frame 800. UL ACK frame 800 may include, but is not limited to include, any of the following: STF/LTF/SIG fields $802_1 \ldots 802_4$ according to an IEEE 802.11 specification such as IEEE 802.11ah, for example; STF/LTF/SIG fields $804_1 \ldots 804_4$ in accordance with the IEEE 802.11ax specification; code domain multiplexed ACK fields $806_1 \ldots 806_4$; and/or data field 810. Each ACK field $806_1 \ldots 806_4$ may include, for example, four multiplexed UL ACKs (or control/short frames) $ACK_1 \ldots ACK_4$ that may be spread and multiplexed using four spreading codes $C_1 \ldots C_4$ and may correspond to the four sub-channels.

FIG. 9 shows a header format of an example grid-based time/frequency domain approach for an UL ACK header 900. The UL ACK header 900 may include, but is not limited to include, any of the following: STF fields $902_1 \ldots 902_4$ that may cover the entire frequency band or channel bandwidth; LTF fields $904_1 \ldots 904_4$, where LTF $904_1$ may cover sub-channel 1, LTF 9042 may cover sub-channel 2, and so on, for different WTRUs; SIG fields $906_1 \ldots 906_4$; and/or ACK fields $908_1 \ldots 908_4$ that may serve as acknowledgements for sub-channels 1-4. The STF $902_1 \ldots 902_4$ may be duplicated (i.e. identical) in each sub-channel, for example.

FIG. 10 shows a header format of another example grid-based time/frequency domain approach for an UL ACK header 1000. The UL ACK header 1000 may include, but is not limited to include, any of the following: STF field 1002 that may be sent over the entire (whole) channel bandwidth; LTF fields $1004_1 \ldots 1004_4$, where LTF $1004_1$ may cover sub-channel 1, LTF $1004_2$ may cover sub-channel 2, and so on, for different WTRUs; SIG fields $1006_1 \ldots 1006_4$ for sub-channels 1-4; and/or ACK fields $1008_1 \ldots 1008_4$ that may serve as acknowledgements for sub-channels 1-4.

FIG. 11 shows a header format of another example grid-based time/frequency domain approach for an UL ACK header 1100. The UL ACK header 1100 may include, but is not limited to include, any of the following: STF field 1102 that may be sent over the entire (whole) channel bandwidth; LTF field 1104 that may be sent over the entire channel bandwidth; SIG fields $1106_1 \ldots 1106_4$ for sub-channels 1-4; and/or ACK fields $1108_1 \ldots 1108_4$ that may serve as acknowledgements for sub-channels 1-4. In the example of FIG. 11, LTF 1104 may be sent on the whole channel, but each WTRU may only use the LTF allocated to the corresponding sub-channel to do channel estimation for the associated sub-channel. In addition to the above examples, a combination of the code domain and time domain may be used for UL ACK aggregation, which may facilitate a robust error recovery capability.

According to an example, CDMA codes or sequences may be used MU ACK aggregation. For example, any one or any combination of the following codes may be used for MU ACK aggregation: Zadoff-Chu code; orthogonal variable spreading factor (OVSF) code; short/long scrambling codes; variable spreading and chip repetition factor (CDMA coding); spread orthogonal frequency division multiplexing (OFDM) and/or coded-OFDM (COFDM) coding; fast/slow frequency spread/hopping code; Hadamard code; and/or other orthogonal codes. In another example, CDMA codes may be designed for MU ACK aggregation that provide orthogonality and a sufficient number codes in the frequency and/or time domain.

Procedures for signaling CDMA codes or sequences to WTRUs for MU ACK aggregation are described herein. CDMA codes or sequences may be signaled to WTRUs in various ways for MU ACK aggregation. For example, CDMA codes or sequences may be signaled or assigned by a beacon or probe. For example, a mother code for MU ACK aggregation may be signaled in the beacon, and the remaining WTRU-specific code(s) may be signaled in the PLCP and/or MAC header for the corresponding WTRU, or implicitly signaled by the sub-channel where the WTRU transmits the data frame. In another example, CDMA codes or sequences may be signaled or assigned by using probe request and response for code exchange, such that the probe frame may be modified such that it is suitable for a CDMA-based solution.

In another example, OVSF or OVSF-like tree based CDMA codes may be used simultaneously for MU transmission or MU ACK aggregation in the code domain. A number of codes may be based on the number of WTRUs to be simultaneously transmitted by CDMA codes. For example, K WTRUs may need K CDMA codes to support simultaneous transmission, so that the spread factor (SF) may be selected equal to or bigger than K. In order to maintain the orthogonality of OVSF codes, certain rules may be applied in the selection of the OVSF codes for MU ACK aggregation and transmission. For example, an OVSF code may be selected to prevent use of a code that is on an underlying branch with higher spreading factor (SF). Similarly, a smaller SF code on the path to the root of the tree may be prevented from being used.

An OVSF code as described above may be signaled to a WTRU using, but not limited to, any one or any combination of the following approaches: signaling the OVSF code in a control frame, PLCP header of the WTRU, and/or MAC header of the WTRU, for example; explicitly signaling the SF and the OVSF code index within the tree with SF=K using a management frame, such as a beacon, probe signal, and/or a control frame; and/or explicitly signaling the selected SF and implicitly signaling the OVSF code index by a pre-defined order, such as an ascending or descending order, within the SF code group for MU transmission or MU ACK aggregation.

According to an example, ACKs received at the AP from multiple WTRUs may be synchronized, as described herein. If propagation delays and/or processing delays from different WTRUs are within a cyclic prefix, a receiver may be able to decode signals from the different WTRUs. However, where the cyclic prefix is not able to cover the difference in delays from different WTRUs, time synchronization may be used in order to maintain spatial orthogonality or orthogonality in the code/sequence domain among the signals. Once signals from multiple transmitters are in over the air and combined together, it may be difficult to change each signal individually. Unless the timing of signals coming from the multiple WTRUs is within a tolerance range of the receiver, time pre-correction may be needed to help ensure the synchronization of simultaneous ACKs received from multiple WTRUs.

The following example procedures may be used by an AP to achieve time synchronization for simultaneous ACK transmissions. An AP may estimate the over-the-air transmission duration between a WTRU and itself based on individual transmissions between itself and the WTRU. These individual transmissions may include, but are not limited to include, for example any of the following: single user data frame transmissions and/or ACK(s) from the WTRU; and/or single user control frame transmissions and responses from the WTRU. For example, the AP may use roundtrip delay, IFS and/or any estimation method to compute the over-the-air transmission duration.

In an example, the AP may keep track of the estimated over-the-air transmission duration(s) for each WTRU associated with the AP, and may use this information to group WTRUs for DL MU transmissions. The AP may use the estimated over-the-air transmission durations to compute timing advances and/or delays to synchronize timing for transmissions from each WTRU. For example, the AP may signal the timing advances and/or delays to each WTRU during a DL MU transmission(s), using a modified SIG-B field (i.e. the SIG field that is different for each WTRU that is a recipient of the downlink transmission). The timing advances and/or delays (also referred to as timing pre-correction) may be quantized. The DL MU transmission may use, but is not limited to use, any of the following transmission techniques: DL MU-MIMO sub-channelized transmission; coordinated orthogonal block-based resource allocation (COBRA) transmission; OFDMA transmission; and/or any simultaneous DL MU transmission. The expected ACK for the DL MU transmission including the timing pre-correction information may be any type of simultaneous UL MU ACK and/or BA.

In an example, each WTRU may receive the DL MU transmission and decode the timing pre-correction information by decoding SIG-B information. Each WTRU may receive and process the rest of the DL MU transmission by receiving and processing the rest of the DL packet. After successfully receiving and processing the rest of the DL packet, each WTRU may adjust the timing of the ACK transmission, which may include, but is not limited to include, any of the following: if there is no timing advance information, the ACK may be sent after a SIFS duration; if the value of the timing advance is a time duration $\tau$, then the ACK may be sent after a duration of SIFS$-\tau$; and/or if timing advance is $-\tau$ (i.e. a timing delay), then the ACK may be sent after a duration of SIFS$+\tau$.

Mechanisms and procedures for frequency synchronization for simultaneous ACK transmissions are described herein. Example procedures may include synchronizing carrier frequencies of ACKs received at an AP from multiple WTRUs. Frequency synchronization may be used to maintain orthogonality in frequency of each ACK. Once signals from multiple transmitters (e.g., multiple WTRUs) are in air and are combined together, it becomes challenging to correct the carrier frequency for each signal individually. Frequency pre-correction may be used to help ensure the frequency synchronization of simultaneous ACKs from multiple transmitters (e.g., multiple WTRUs) received at receiver (e.g., an AP) and to ensure that the carrier frequency of the simultaneous signals containing the ACKs are within a tolerance range of receiver.

Example procedures may be used by an AP to achieve synchronization in frequency for simultaneous ACK transmissions. For example, the AP may estimate the frequency offset of each carrier frequency using individual transmissions from each the WTRU, which may include, but is not limited to include, any of the following: the estimation may include a coarse frequency offset and/or a fine frequency offset; the individual transmissions may include SU control and/or data transmissions in the UL; the AP may use a portion of a preamble of the individual transmissions (e.g., L-STF, L-LTF, HT-STF, HT-LTF, VHT-STF or VHT-LTF, or corresponding fields in later generation WLAN implementations); and/or the AP may use any method to estimate carrier frequency offset.

In another example procedure used by the AP for synchronization, the AP may keep track of the estimated carrier frequency offset for each WTRU with which it is associated, and may use this information to group WTRUs for downlink MU transmission. In another example, the AP may calculate a frequency pre-correction for each WTRU, for example, based on the estimated carrier frequency offsets for each WTRU.

In another example, the AP may signal frequency pre-corrections to each WTRU during a DL MU transmission using, for example, a modified SIG-B field (i.e. the SIG field that is different for each WTRU which were recipients of the downlink transmission). The frequency pre-corrections may be quantized. The DL MU transmission may be, but is not limited to, any of the following transmission techniques: a DL MU-MIMO sub-channelized transmission; COBRA transmission; OFDMA transmission; and/or any other simultaneous DL MU transmission. The expected ACK may of any type of simultaneous MU UL ACK.

In another example, Each WTRU may receive the MU downlink transmission and decode the frequency pre-correction information, for example, by decoding the SIG-B information. In another example, after successfully receiving and processing the rest of the packet, each WTRU may pre-correct the carrier frequency. As an example of pre-correction by the WTRU, if the frequency pre-correction received at the WTRU from AP is $\delta$ (e.g., $\delta$ may be any positive or negative value or 0), then the WTRU may transmit an ACK back to the AP (e.g., using techniques described herein) using carrier frequency f$-\delta$, where f is the original carrier frequency for the transmission.

As another example of UL AC aggregation in the code domain, UL ACK aggregation in the code domain may be combined with UL MU transmissions. With the use of UL OFDMA and/or UL-MIMO (e.g., in IEEE 802.11ax), UL ACK aggregation, in response to DL MU transmission, may be performed in the code domain and may be combined with UL MU transmissions.

Example mechanisms and methods for UL ACK aggregation in the spatial domain are described herein. Example approaches to UL ACK aggregation in the spatial domain may include, but are not limited to include, any of the following: spatial-orthogonal transmission using beamforming; and/or multi-user spatial nulling. These approaches are described in detail below.

According to an example approach, spatial orthogonal transmission for UL ACK aggregation may use beamforming. The simultaneous transmission of UL ACKs may use spatial domain techniques. In an example, a precoding may be applied at each WTRU to create orthogonal spatial directions such that UL ACKs may be aggregated and transmitted simultaneously.

Figure 12:
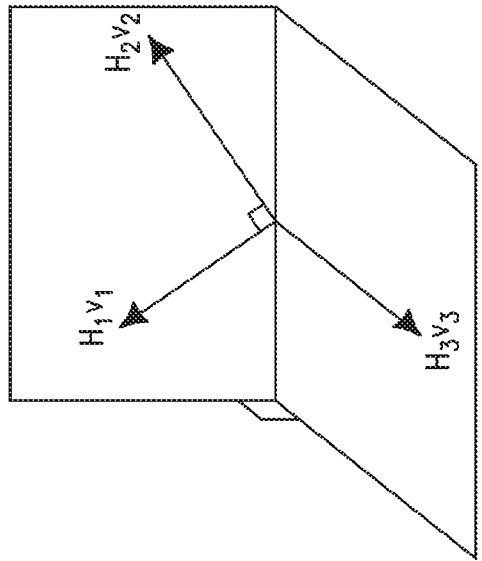
FIG. 12 shows a signaling diagram of a simultaneous uplink (UL) ACK transmission procedure using spatial orthogonal transmission.
Figure 12:
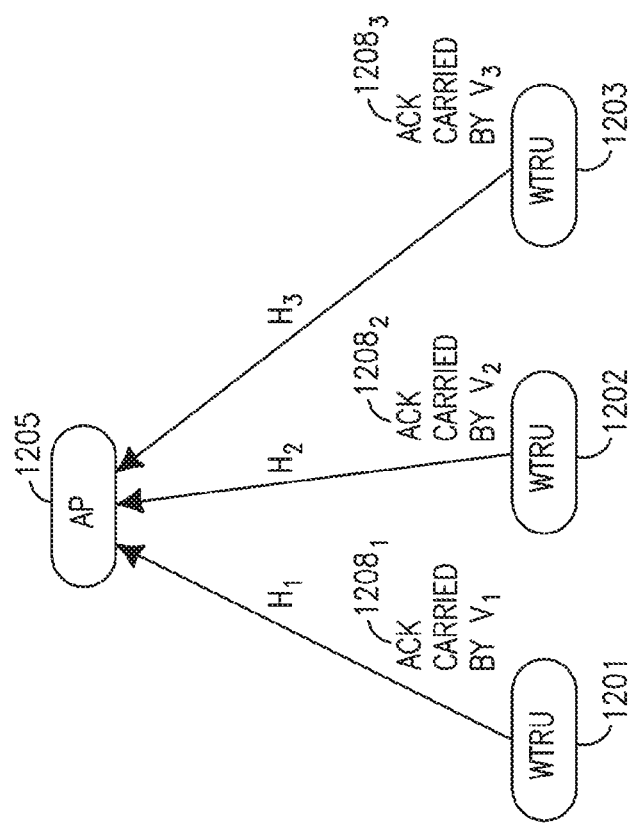

FIG. 12 shows a signaling diagram of a simultaneous UL ACK transmission procedure 1200 using spatial orthogonal transmission. FIG. 12 includes an AP 1205 in communication with WTRUs 1201, 1202 and 1203 over respective channels with channel matrices $H_1$, $H_2$, and $H_3$. In the example of FIG. 12, the AP 1205 may have estimated the channel state information (CSI) of each channel with channel matrix $H_1$, where i=1–n, in a previous uplink communication with each corresponding WTRU 1201, 1202 and 1203. The AP 1205 may assign each WTRU 1201, 1202, and 1203 to the same group for simultaneous UL ACK transmissions. The AP may 1205 may designate a beamforming vector design order and/or spatial constraints for each WTRU 1201, 1202, and 1203. The beamforming vector design order may be consequential, as beamforming for the first WTRU 1201 may be based on a singular value decomposition (SVD) and may not have any spatial constraints. Beamforming for a second WTRU 1202 may steer its transmission direction such that it is orthogonal to the beamforming vector of the first WTRU 1201. Beamforming for a third WTRU 1204 may make its beamforming vectors orthogonal to the previously designed two beamforming vectors, and so forth.

In the example shown in FIG. 12, each WTRU 1201, 1202, and 1203 may perform channel estimation of its corresponding channel with channel matrix $H_i$ (i=1, 2, 3) for the DL transmission. Each WTRU 1201, 1202, and 1203 may calculate its corresponding beamforming vector $v_i$ (i=1, 2, 3) based on its DL channel estimate and/or its order. After the DL transmission is complete, the WTRUs 1201, 1202, and 1203 may simultaneously transmit their ACKs 1208$_1$, 1208$_2$ and 1208$_3$, respectively, using the calculated beamforming vectors $v_i$ (i=1, 2, 3), which may occur after deferring by a SIFS (or other interframe spacing) duration. The ACKs 1208$_1$, 1208$_2$ and 1208$_3$ are received as a mixed UL ACK signal 1208$_1$, 1208$_2$ and 1208$_3$ at the AP.

On receiving the mixed UL ACK signal 1208$_1$, 1208$_2$ and 1208$_3$, the AP 1205 may make i copies (e.g., 3 copies in FIG. 12) of the received mixed UL ACK signal 1208$_1$, 1208$_2$ and 1208$_3$ and may apply combining vectors matched to $H_i v_i$ (e.g., $H_1 v_1$, $H_2 v_2$ and $H_3 v_3$ in the example of FIG. 12) to extract an individual ACK from each copy of the received signal 1208$_1$, 1208$_2$ and 1208$_3$, respectively.

In FIG. 12, all three WTRUs 1201, 1202, and 1203 may have N antennas (e.g., N≥1) and the AP may have M≥N antennas. The channel matrices $H_i$ (i=1, 2, 3) may be N×N channel matrices between WTRU 120$i$ and the AP 1205. The symbols of the ACK frames 1208$_1$, 1208$_2$ and 1208$_3$ at each WTRU 1201, 1202, 1203 may be carried by the N×1 beamforming vector $v_i$ (i=1, 2, 3), respectively. The beamforming vectors $v_1$, $v_2$, and $v_3$ may be determined or generated such that the effective channel vectors $H_1 v_1$, $H_2 v_2$ and $H_3 v_3$ are orthogonal to each other (an example orthogonality of channel vectors $H_1 v_1$, $H_2 v_2$ and $H_3 v_3$ is shown in FIG. 12).

The beamforming vectors $v_1$, $v_2$, and $v_3$ may be calculated one by one, for example by each WTRU 1201, 1202, and 1203. For the first vector $v_1$, no spatial restrictions may be imposed. The SVD decomposition of channel matrix $H_1$ may be given by the following:

$$H_1 = U_1 \Sigma_1 W_1^H \quad \text{Equation 1}$$

where $U_1$ and $W_1$ may unitary matrices and $\Sigma_1$ may include the singular values on the diagonal in decreasing order. Denoting the first column of $W_1$ as $W_1(1)$, it may be that $v_1 = W_1(1)$, which corresponds to the largest singular value of $H_1$.

Vector $v_2$ may be calculated (e.g., by WTRU 1202) to adjust the effective channel $H_2 v_2$ in a direction that is orthogonal to $H_1 v_1$. With a unit power constraint on $v_2$, the design equations of $v_2$ may be given by:

$$H_1 v_1 \perp H_2 v_2,$$

$$\|v_2\|_2 = 1, \quad \text{Equation 2}$$

where $\perp$ indicates that the two vectors are perpendicular (and hence orthogonal) to each other.

The beamforming vector $v_3$ may similarly be calculated (e.g., by WTRU 1203) such that the effective channel $H_3 v_3$ is orthogonal to both $H_1 v_1$ and $H_2 v_2$. Accordingly, the design equations of $v_3$ may be expressed as follows:

$$H_2 v_2 \perp H_3 v_3,$$

$$H_1 v_1 \perp H_3 v_3,$$

$$\|v_3\|_2 = 1. \quad \text{Equation 3}$$

Thus two equations may be solved in order to calculate beamforming vector $v_2$. Similarly, three equations may be solved in order to calculate the beamforming vector $v_3$. The beamforming vectors $v_1$, $v_2$, and $v_3$ may be N dimensional, where N may be refer to the number of antennas at a corresponding WTRU (e.g. WTRU 1201, 1202, and/or 1203). At WTRU 1203, there may be N elements of $v_3$ to be determined and three equations. As long as N≥3, at least one solution may be found. Likewise, to find a solution of the two equations at WTRU 1202, at least 2 antennas may be needed. As a result, N≥3 antennas at each WTRU may be used.

More generally, if it is desired for K>3 WTRUs to simultaneously transmit ACKs to the AP using a spatial orthogonal method, the beamforming vector may need to be calculated for the k-th WTRU under k constraining equations, which may be expressed by the following:

$$H_1 v_1 \perp H_k v_k,$$

$$H_2 v_2 \perp H_k v_k,$$

$$\ldots$$

$$H_{k-1} v_{k-1} \perp H_k v_k,$$

$$\|v_k\|_2 = 1. \quad \text{Equation 4}$$

In this case, K antennas may be used at each WTRU in order to guarantee that it possible to solve for the expected beamforming vector for each WTRU.

Other approaches for aggregating a UL ACK such that multiple WTRUs may simultaneously send their ACKs may include implementing a set of receiver filters to de-multiplex each WTRU's ACK from the received signal.

Figure 13:
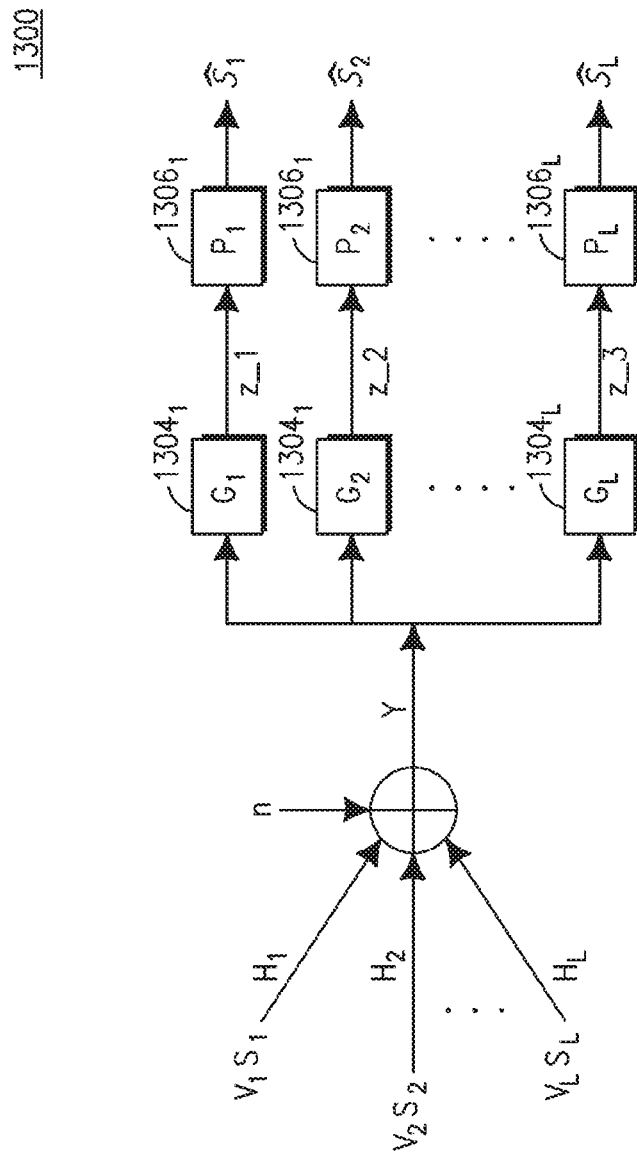
FIG. 13 shows a block diagram of an example receiver structure at an access point (AP) using a spatial nulling scheme for UL ACK aggregation.

Another example approach to UL ACK aggregation in the spatial domain may include a MU spatial nulling receiver that may de-multiplex each WTRU's ACK from the received signal. FIG. 13 shows a block diagram of an example receiver structure 1300 at an AP using a spatial nulling scheme for UL ACK aggregation.

In the example scenario of FIG. 13, L WTRUs may transmit L ACKs concurrently to the associated AP, denoted by $v_l s_l$ for l=1 ... L. Each WTRU may include M antennas, and the AP may include N antennas. A channel between the l-th WTRU and the AP may be denoted by corresponding channel matrix $H_l \in \mathbb{C}^{N \times M}$, (l=1 ... L).

In an example, a block diagonalization technique may be employed to separate the concurrent ACKs. For example, $\overline{H}_l$ may be used to denote a composite channel matrix consisting of all the UL MIMO channels except $H_l$, which may be denoted as follows:

$$\overline{H}_l = [H_1, H_2, \ldots, H_{l-1}, H_{l+1}, \ldots, H_L]. \quad \text{Equation 5}$$

The spatial nulling scheme 1300 may employ L filters 1304$_1$ ... 1304$_L$ for the L WTRUs. The l-th receiver filter with associated matrix $G_l \in \mathbb{C}^{N \times N}$ may be designed in the null space of $\overline{H}_l$. The filtering by receiver filters 1304$_1$ ... 1304$_L$ may remove or eliminate the interference from other WTRUs. This spatial constraint may use a number of antennas at the AP of N>(L−1)M.

The SVD of the composite channel matrix $\overline{H}_l$ may be denoted as follows:

$$\overline{H}_l = [U_{s,l} U_{n,l}] \Sigma_l W_l^H \quad \text{Equation 6}$$

where $U_{n,l} \in \mathbb{C}^{N \times [N-(L-1)M]}$ may include the last N−(L−1)M left eigenvectors of $\overline{H}_l$, which may mean that the column vectors of $U_{n,l}$ are an orthogonal basis of the null space of $\overline{H}_l$. Thus, $U_{n,l}^H \overline{H}_l = 0$. It may be that the AP has CSI of all UL MIMO channel matrices, $H_1, H_2, \ldots, H_l$. Thus, the receiver filter matrix $G_l$ of WTRU l, for l=1 . . . L, may be chosen as $G_l = U_{n,l} U_{n,l}^H$.

At the transmitter of each WTRU l for l=1 . . . L, CSI may not be needed. Only one spatial stream may be used to transmit the ACK from each WTRU. As a result, the information symbol $s_l$ at WTRU l (l=1 . . . L) may be transmitted with equal weight at each of the M antennas; that is, using the same beamforming vector $v_l = 1/\sqrt{M} [1, 1, \ldots, 1]^T$ at each WTRU l for l=1 . . . L.

The received signal y at the AP may be denoted as follows:

$$y = \sum_{i=1}^{L} H_i v_i s_i + n \qquad \text{Equation 7}$$

with n denoting an n-dimensional additive noise.

All L interference nulling matrices may be written together to form a de-multiplex matrix $G = [G_1^T, G_2^T, \ldots, G_L^T]^T$. The de-multiplexed receive signal z may be expressed as follows:

$$\begin{aligned} z &= G \sum_{i=1}^{L} H_i v_i s_i + n \qquad \text{Equation 8} \\ &= \begin{bmatrix} G_1 \\ G_2 \\ \vdots \\ G_L \end{bmatrix} [H_1, H_2, \ldots, H_L] \text{diag}(v_1, v_2, \ldots, v_L) s + \begin{bmatrix} G_1 \\ G_2 \\ \vdots \\ G_L \end{bmatrix} n \\ &= \begin{bmatrix} G_1 H_1 v_1 & & & \\ & G_2 H_2 v_2 & & \\ & & \ddots & \\ & & & G_L H_L v_L \end{bmatrix} \begin{bmatrix} s_1 \\ s_2 \\ \vdots \\ s_L \end{bmatrix} + \begin{bmatrix} G_1 \\ G_2 \\ \vdots \\ G_L \end{bmatrix} n \end{aligned}$$

where $s = [s_1, s_2, \ldots, s_L]^T$.

The l-th received ACK signal may be separated from other ACK signals because $G_l H_k = 0$, for $\forall k \neq l$. The l-th received ACK signal may be represented by:

$$\begin{aligned} z_l &= G_l H_l v_l s_l + G_l n \qquad \text{Equation 9} \\ &= q_l s_l + G_l n \end{aligned}$$

where $q_l$ is the effective vector channel for $s_l$.

The combining vector $p_l = q_l^H / \|q_l\|_2^2$, 1306, for l=1 . . . L, may be applied to signal $z_l$ to obtain the symbol $\hat{s}_l$ (l=1 . . . L), that is an estimate of the symbol transmitted by corresponding WTRU l, as follows:

$$\hat{s}_l = s_l + [q_l^H G_l n]/\|q_l\|_2^2 \qquad \text{Equation 10}$$

Procedures and mechanisms may be used for UL ACK aggregation for DL OFDMA and/or MU-MIMO, as described herein. UL ACK aggregation may reduce feedback overhead for simultaneous DL transmissions, for example in DL OFDMA and/or DL MU-MIMO, which may result in throughput (TP) improvements. In an example, each WTRU may indicate its ability to support UL ACK aggregation to the AP, for example, by providing an indication in the capability information field in its beacon. A capability information indication may be included in the SIG field of the PPDU, for example.

For example, capability information may include, but is not limited to include, an indication for support for any one or more of the following: an aggregated ACK; an aggregated delayed ACK; and/or an aggregated BA. An aggregated ACK capability may include the capability of an aggregated negative ACK (NAK) in combination with, or instead of, an ACK in the same aggregated capability field(s). A capability information element may also indicate support for aggregation of UL short ACKs and/or short (data or control) frames.

In an example, DL ACK aggregation may be indicated in the capability information field of the beacon from the WTRU. DL ACK aggregation may support the same capabilities as UL ACK aggregation. The capability information field may include a group based UL ACK capability indication. For example, UL ACK aggregation may be defined for, but is not limited to, any of the following: frequency; channel; code; sequence; time unit; and/or spatial groups, as described above.

Methods and procedures for UL aggregation are described herein. In an example, an indication or request for UL aggregation of ACK responses may be indicated in a MAC information element (IE), and/or within the PHY header as an indication in the SIG information field. A request for UL aggregation of ACK responses from two or more WTRUs that have associated on different channels may be determined by the AP by considering the impact on the overall delay of the aggregated transmissions. For example, a request may be made for an immediate normal ACK response for one or more WTRUs, and an aggregated ACK response for the remaining WTRUs, for example. In another example, a request may be made for a delayed ACK response for one or more WTRUs, and an aggregated ACK response for the remaining WTRUs.

In an example, UL ACK aggregation may be determined or requested using an Aggregation ACK Request (AAR) control frame. FIG. 14 shows a frame format for an example AAR control frame 1400. The AAR control frame 1400 may be sent by an AP to a WTRU, for example. The AAR control frame 1400 may include, but is not limited to include, any of the following: a frame control field 1404; a duration field 1406; an RA field 1408; a TA field 1410; an AAR control field 1412; a multi-TID control field 1414 (that may include repeated information for each TID, for example); starting sequence control (SSC) fields e.g., there may be two to eight SSC fields); and FCS field(s) 1416. The multi-TID control field 1414 may indicate that the AAR control frame supports multiple aggregation ACK sessions for one or more channels.

FIG. 15 shows a frame format for an example aggregated ACK (AA) response frame 1500. The AA response frame 1500 may be sent by a WTRU to an AP, for example. The AA response frame 1500 may include, but is not limited to include, any of the following: a frame control field 1504; a duration field 1506; an RA field 1508; a TA field 1510; an AA control field 1512; SSC field(s) 1514; an AA bitmap field 1515; and FCS field(s) 1516. The AA bitmap field 1515 may indicate the receive status for up to eight MAC service data units (MSDUs) carried on up to eight channels, for example.

FIG. 16 shows a frame format for an example block ACK (BA) AA response frame 1600. The BA AA response frame 1600 may be sent by a WTRU to an AP, for example. The BA AA frame 1600 may include, but is not limited to include, any of the following: a frame control field 1604; a duration field 1606; an RA field 1608; a TA field 1610; A BA control field 1612; an AA control field 1613; SSC field(s) 1614; a BA/AA bitmap field 1615; and FCS field(s) 1516. In an example, a concatenation of BAs from up to eight aggregated channels may be included the BA AA frame 1600. In an example, the BA AA frame 1600 may be similar to the AA frame 1500 except that a BA control field 1612 and BA/AA bitmap field 1615 may be included for each aggregated ACK channel defined by the AA bitmap 1615.

In an example, the request or indication for UL aggregation of ACK responses may be carried on a primary channel, and the indication for ACK responses of WTRUs that have associated on the primary channel and/or secondary channels may be provided. For example, the indication for ACK responses from secondary channels may be provided by a bitmap (e.g., the bitmap may be four to eight bits in length and include a logical value of 1/0 in each bit location), which may provide an ACK response request for WTRU(s) associated on each channel. The aggregated ACK responses may be carried on one or more sub-channels within the primary channel, and/or on one or more secondary channels.

In an example, if there is a primary channel and a secondary primary channel, the channel for which the WTRU, or group of WTRUs, received their channel resource allocations may be reserved for aggregated ACK responses from those WTRU(s). In another example, the preferred channel for aggregated ACK responses for a particular group of WTRUs, or associated Group ID, may be indicated in an information element within the MAC header, frame body or elsewhere (e.g. in a frame from the AP).

In an example, if one or more ACK responses indicate a negative acknowledgment (NAK), the responses that contain a NAK may take priority for transmission over associated ACK responses. A lack of response for a channel or sub-channel in an aggregated ACK response may also be considered a NAK response. The transmitter (e.g., AP) may elect to poll WTRUs for which a response has not been received for an explicit ACK or NAK response.

Figure 17:
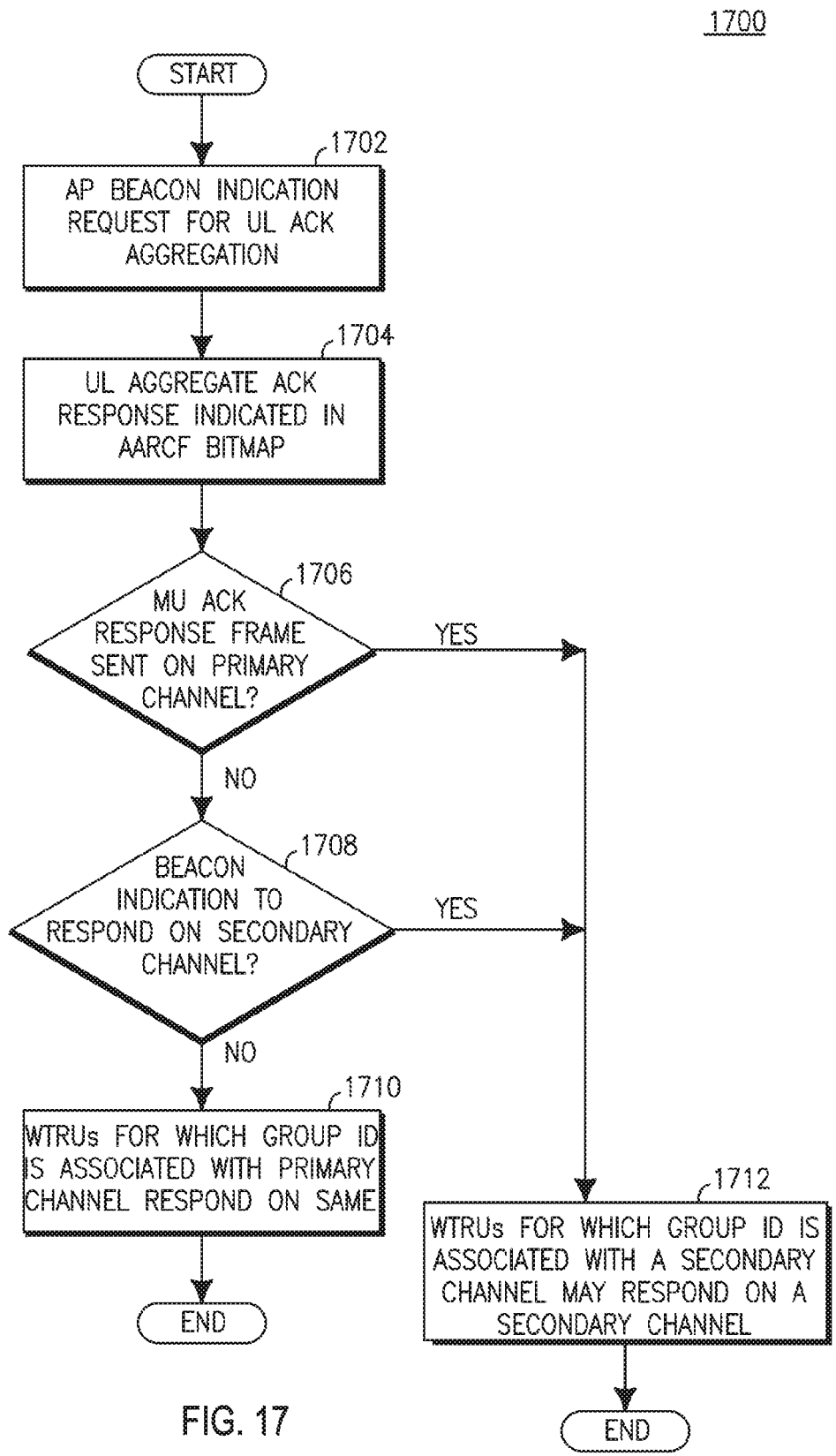
FIG. 17 is a flow diagram of an example UL aggregated ACK response procedure.

FIG. 17 is a flow diagram of an example UL aggregated ACK response procedure 1700. At 1702, an AP may send an beacon indication or request for UL ACK aggregation, 1702 (FIG. 14 shows an example request frame). At 1704, the AP may receive from the WTRUs an UL aggregated ACK response frame, or MU ACK response frame, (FIGS. 15 and 16 show example response frames), in which UL aggregated ACK response(s) may be indicated in an Aggregation ACK Request Control Frame (AARCF) bitmap. At 1706, the AP determines if the MU ACK response frame was sent on a primary channel.

If the MU ACK response frame was sent on a primary channel, then the WTRUs for which the group ID is associated with a secondary channel may respond on a secondary channel, 1712. If the MU ACK response frame was not sent on a primary channel, then the AP may check for a beacon indication to respond from at least one WTRU on a secondary channel, 1708. If a beacon indication is detected on a secondary channel, then the WTRUs for which the group ID is associated with a secondary channel may respond on a secondary channel, 1712. If a beacon indication is not detected on a secondary channel, the WTRUs for which the group ID is associated with the primary channel may respond on the primary channel, 1710.

Example mechanisms and methods for DL ACK aggregation are described herein, and may be used for UL OFDMA and/or UL MU-MIMO. Approaches to DL ACK aggregation may include, but are not limited to include, any of the following: MU BA in DL; and/or reuse of any of the UL ACK aggregation techniques discussed herein for DL ACK. MU and multi-WTRU may be used interchangeably herein, and multi-WTRU BA may equivalently imply multi-WTRU BA/ACK in all examples given herein. Additionally, channel, sub-channel, and/or resource unit may be used interchangeably herein. Additionally, user, WTRU, and STA and similarly multi-user (MU) and multi-WTRU (or multi-STA), may be used interchangeably herein.

Figure 18:
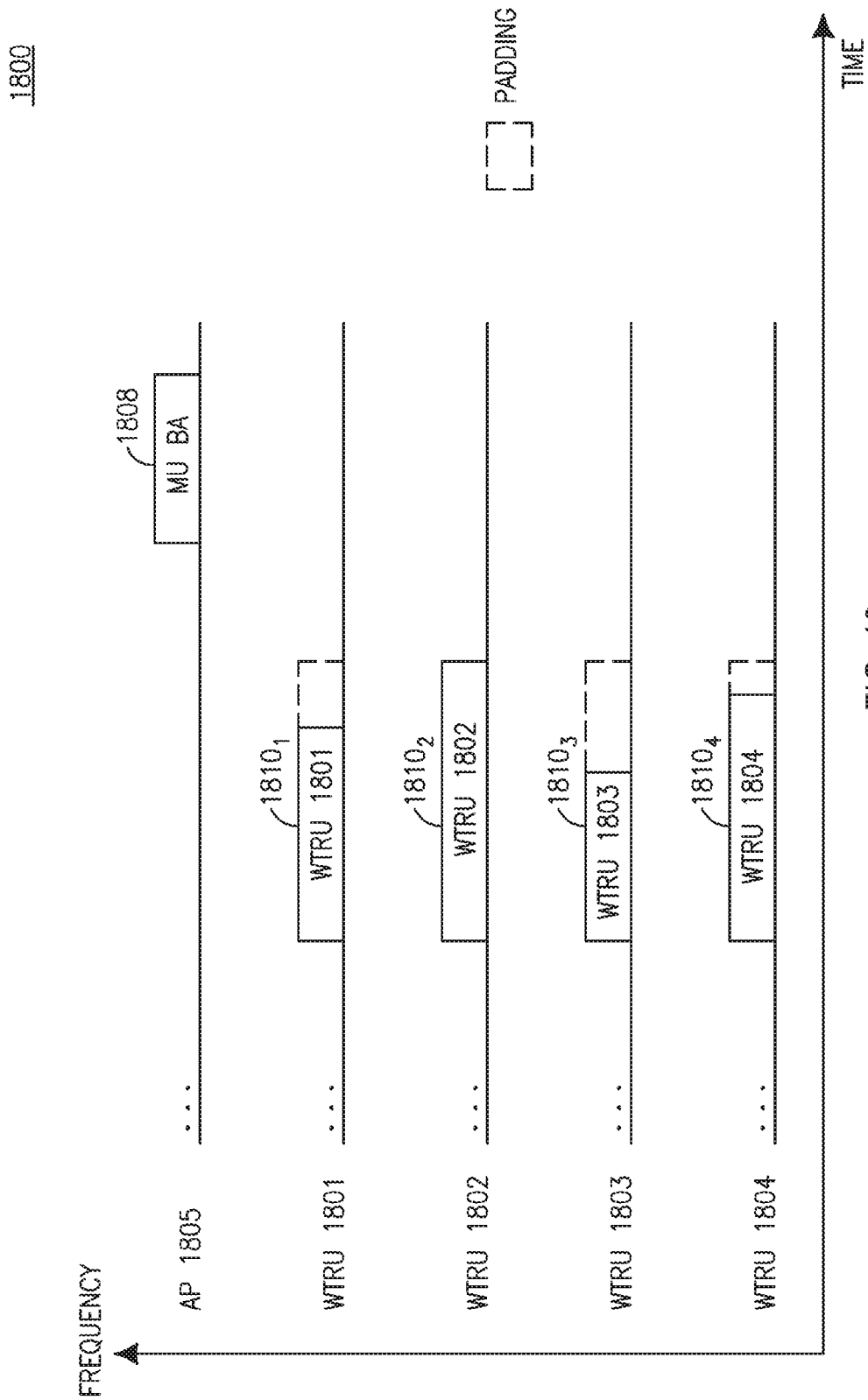
FIG. 18 shows a signaling diagram of an example multi-user (MU) BA procedure.

An MU (or multi-WTRU) BA may be used by the AP to acknowledge multiple WTRUs. FIG. 18 shows a signaling diagram of an example MU BA procedure 1800. Although FIG. 18 (and similarly any other figure described herein) herein may show the vertical axis as frequency, any channel scheme may be applied for transmission that may not be limited to the frequency versus time domains. For example, channels (e.g. resource units and/or sub-channels) may be distinguished in the frequency and/or spatial domain, using OFDMA and/or MU-MIMO, for example.

In this example, WTRUs 1801, 1802, 1803, and 1804 may simultaneously transmit UL respective frames (or packets) $1810_1$ . . . $1810_4$ to AP 1805, where the UL frames $1810_1$ . . . $1810_4$ may be UL-MIMO or UL-OFDMA transmissions, for example. The WTRUs 1801, 1802, 1803, and 1804 may pad bits (shown with the dotted line in FIG. 18) at the end of each respective packet $1810_1$ . . . $1810_4$ in order to (approximately) align the packets in time. In another example, the WTRUs 1801, 1802, 1803, and 1804 may not pad bits at the end of the packets $1810_1$ . . . $1810_4$.

In another example, the packets or frames $1810_1$ . . . $1810_4$ transmitted by the WTRUs 1801, 1802, 1803, and 1804 may be aggregated with UL ACKs/BAs or delayed UL ACKs/BAs (not shown) in response to a DL MU transmission such as DL OFDMA or DL-MIMO transmission (not shown). After the termination of the UL simultaneous transmission of packets $1810_1$ . . . $1810_4$, there may be an IFS duration such as SIFS or RIFS. The AP 1805 may send a MU BA frame 1808 to WTRUs 1801, 1802, 1803, and 1804. Various example MU BA transmission methods and frame formats are described herein.

Example mechanisms and procedures for MU BA include a multi-dimensional (MD) MU BA procedure. In an example, An MD MU BA frame may be transmitted over the entire available bandwidth using all available resource units. The MD MU BA frame may be transmitted using a broadcast transmission scheme, such as an omnidirectional transmission scheme, which may allow all users in the BSS to receive the MD MU BA frame.

In an example, the MU BA MAC frame may be multiplexed in the high-efficiency (HE) PPDU by DL MU-MIMO or DL OFDMA. For example, the MU BA frame may be transmitted or repeated over a WTRU-specific sub-channel, such as the sub-channel or resource units that the WTRU used for UL data transmission (e.g., to simplify the implementation at the WTRU). In an example, the AP may prepare a MD MU BA frame in any one or more of the following example circumstances: where the AP receives a UL MU transmission from multiple WTRUs; and/or where the AP receives transmissions with delayed BA protocol, where the transmissions may have been previously received by the AP from multiple WTRUs.

Figure 19:
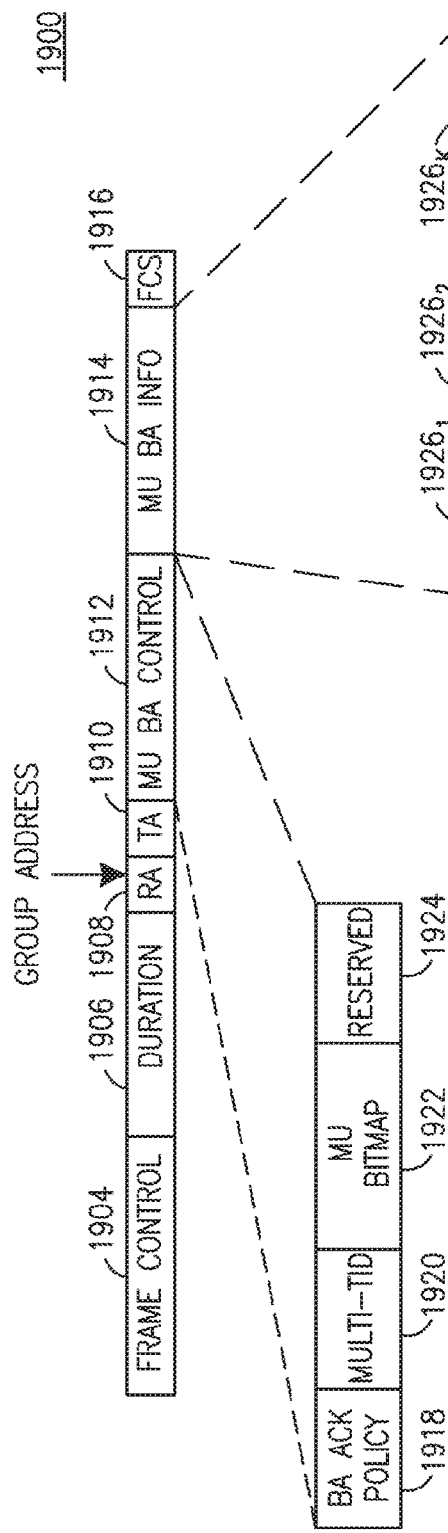
FIG. 19 shows a frame format of an example multi-dimensional (MD) MU BA frame.
Figure 19:
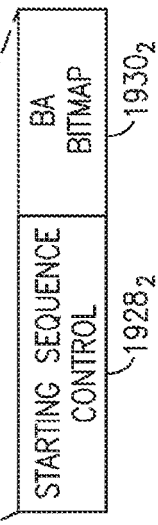

FIG. 19 shows a frame format of an example MD MU BA frame 1900. The MD MU BA frame 1900 may include, but is not limited to include, any of the following fields: a frame control field 1904; a duration field 1906; an RA field 1908; a TA field 1910; an MU BA control field 1912; an MU BA information field 1914; and/or an FCS 1916.

The MD MU BA frame 1900 may be indicated in the frame control field 1904 using, for example, any one or more of the following methods: a subtype may be defined for MD MU BA control frame (e.g., under control type (01), the subtype for MD MU BA control frame may be any of the values belonging to [0000, 0011]; a type may be defined (e.g., type=11 may have corresponding type description as MU BA); and/or reusing a BA type and subtype, where the RA field 1908 may be revisited, as described below, after detecting that the frame 1900 is an MU (Multi-WTRU) BA frame (may be signaled later in the frame 1900).

The RA field 1908 may include addresses of the recipient WTRUs, and may include for a group address(es) that represent multiple WTRUs. The RA field 1908 may or may not be a MAC address. The RA field 1908 may address a recipient WTRU using any one or more of the following example methods. In an example method, the RA field 1908 may carry the group ID, which may be combined with (full or partial) AID to identify the intended recipient WTRU (receiver) of the BA information field 1914 (the partial AID may be present the corresponding WTRU subfield 1926$_i$ of the MU BA info field 1914). In another example method, the RA field 1908 may carry the group ID, which may be combined with (partial) AID to identify the intended receiver of the MU BA information field 1914 (the partial AID may present in the MU BA control field 1912 such as in the MU bitmap subfield 1922 and/or the reserved subfield 1924).

In another example method, the RA field 1908 may be the MAC address or AID of the first (WTRU 1) or last (WTRU k) WTRU of the MU BA information field 1914. The RA field 1908 may be used to derive the address or AID of each WTRU carried in MU BA info field 1914 by a pre-defined rule. In another example method, the RA field 1908 may be re-interpreted as multiple WTRUs' AID. For example, a 48 bit RA may support three WTRUs with 16 bit AID each. In another example, a 48 bit RA may support four WTRUs with a 12 bit AID each. In another example, a 48 bit RA may use the first M bits to indicate the group ID, and 48-M bits to indicate (partial) AID for multiple WTRUs.

In another example method, the RA field 1908 may present nothing, and/or may fill a pre-defined sequence. The AID present for each WTRU may be present in each WTRU subfield 1926l . . . 1926k to be uniquely addressed. In another example method, the MD MU BA frame 1900 may contain only one BA info field 1914, and the RA field 1908 may include the address of the WTRU. In another example method, if the MD MU BA frame may contain more than one BA info field 1914 (or an MU BA info field 1914), and the RA field 1908 may include a group address for a group of multiple WTRUs. The group address may be, for example, a MAC address that has the group bit equal to 1. The group address may be reserved by the BSS and assigned to certain WTRUs by the BSS.

The TA field 1910 may include an address of the transmitter (e.g., the AP), which may be, for example, the BSSID of the transmitter.

The MU BA control field 1912 may include, but is not limited to include, any one or more of the following subfields: BA ACK policy field 1918; multi-TID field 1920; compressed bitmap field (not shown); MU bitmap field 1922; and/or reserved subfield(s) 1924. The BA ACK policy subfield 1918 may indicate a normal ACK or delayed ACK. The multi-TID subfield 1920 may indicate multiple TIDs or the same (a common) TID. The TID compressed bitmap field (not shown) may indicate that the MU BA frame 1900 contains the compressed bitmap (i.e., 8 octet block ACK bitmap) or the uncompressed bitmap (i.e., 128 octet block ACK bitmap). In an example, the MU bitmap subfield 1922 may be used to indicate a multi-STA Block ACK that may not be sent under Delayed and/or HT-delayed agreements. The MU bitmap subfield 1922 may be used to indicate the acknowledgement for each user (e.g., WTRU) identified in the RA field 1908. In an example, it may be possible to acknowledge a subset of WTRUs in a group of WTRUs. The MU bitmap subfield 1922 may contain N bits, where N is the number of WTRUs signaled in the RA field 1908. Each bit may be used to indicate whether the BA information (e.g., 1926i) of that user/WTRU (e.g. WTRU i) is included in the MD MU BA control frame 1900. The reserved field 1924 may include the number of WTRUs in MU BA information field 1914.

The MU BA information field 1914 may include subfields for WTRUs 1 . . . k. The total number of WTRUs k included in the MU BA Information field 1914 may depend on the MU bitmap field 1922 defined in the MU BA control field 1912. Each WTRU subfield 1926l . . . 1926k may include a starting sequence subfield 1928i and/or a BA bitmap subfield 1930i (for i=1 . . . k).

The MU BA information field 1914 may be formed using any one or more of the following techniques. In an example, a fixed length may be used for each WTRU subfield 1926$_1$ . . . 1926$_k$. In an example, per-WTRU information may be inserted before the starting sequence control field 1928$_1$ . . . 1928$_k$ for each WTRU subfield 1926$_1$ . . . 1926$_k$. The per-WTRU information may include, but is not limited to include, any of the following: AID or (partial) AID; BA/ACK indication; and/or TID value.

In another example, variable lengths may be used for different WTRU subfields 1926$_1$ . . . 1926$_k$, which may be prepended by a pre-defined sequence or delimiter used to define the WTRU subfield's position and length inside the aggregated MU BA Information field 1914. In an example, padding may be used after each WTRU's BA bitmap 1930$_1$ . . . 1930$_k$. The pre-defined sequence may be indicated in the MAC header or implicitly determined, for example. In an example, different WTRU subfields 1926$_1$ . . . 1926$_k$ may be prepended by a per-WTRU information that may determine the length of each WTRU subfield. For example, if an ACK indication is present in a per-WTRU info field 1926$_i$, then the starting sequence control 1928$_i$ and/or BA bitmap 1930i may not be present. In another example, if a BA indication is present in the per-WTRU info field 1926$_i$, then the starting sequence control 1928$_i$ and the BA bitmap 1930$_i$ may be present.

Example AP procedures for MD MU BA are described herein. In an example, the AP may receive an UL MU transmission that may contain multiple (data) packets from one or more WTRUs. The AP may detect the transmitters (e.g., WTRUs) of the detected packets and may and prepare a first dimension bitmap (e.g. MU bitmap 1922 in FIG. 19) using any one or more of the following example procedures. The AP may check the group address (for example group ID), that may be carried in the UL MU PLCP header, noting potential transmitters. The group ID may indicate M potential transmitters. The AP may receive multiple packets, and each packet may be in the AMPDU format. The AP may obtain the MAC address from each packet. The total number of transmitters may be denoted by k, where k≤M. The AP may prepare a first dimensional bitmap (i.e. MU bitmap), according to the above information. The MU bitmap may contain M bits, where each bit may represent whether the corresponding WTRU in the group has a BA in the second dimension (e.g., "1" to indicate a BA in the second dimension, and "0" to indicate absence of BA in the second dimension). In the example shown in FIG. 19, the MU bitmap 1922 may contain k "1" s.

In an example, the AP may generate a second dimension bitmap, which may be denoted as BA bitmap, by checking received packet(s) from each WTRU. The received packet(s) may be in AMPDU format (i.e. an aggregation of multiple MPDUs) or MPDU format (non-aggregate MPDUs). In the example case that A-MPDU format is used, the received packet (AMPDU) may be from one WTRU. It may be possible that a particular WTRU has two or more packets (A-MPDUs). The AP may prepare the second dimension bitmap using any one or more of the following procedures: the AP may collect all the packets from the particular WTRU; The AP may check the FCS of each MPDU; and/or The AP may prepare a second-dimension BA bitmap for the particular WTRU. In the example case that MPDU format is used, the AP may prepare the second dimension bitmap by generating a normal ACK that may be indicated by pre-defined bitmap or dummy bitmap. For example, a pre-defined 2-bit bitmap may be used to support up to 4 ACK acknowledgement states (e.g., ACK, NACK, DTX and reserved.)

In an example, the AP may prepare a MU BA info field and may form an MD MU BA frame, such as the MD MU BA frame 1900 shown in FIG. 19. In an example, if a WTRU subfield with a fixed length is in MU BA info field, the AP may insert k WTRU subfields into the MU BA info field in a pre-defined order, for example from WTRU 1 to WTRU k. In an example, if a WTRU subfield with a variable length is in MU BA info field, the AP may insert k WTRU subfield(s) with pre-defined sequences or delimiters and/or padding into the MU BA info field.

Example WTRU (STA) procedures for MD MU BA are described herein. A WTRU addressed by the AP may use the pre-defined bitmap, as discussed above, to allocate its ACK/BA response in the ACK/BA frame. The WTRU may receive a DL MD MU BA frame, which may or may not be a response to the WTRU. The WTRU may check the frame control field, and recognize the frame as an MD MU BA frame. The WTRU may check the second address field (or the first address field), which may contain a BSSID. If the WTRU is not associated with the BSSID, the WTRU may not be a potential receiver of the MD MU BA frame. The WTRU may check the first address field (or the second address field), which may be re-interpreted as a group address (for a group of WTRUs) in the MD MU BA frame.

In further examples, the WTRU may check the group address. If the WTRU is the (or one of) addressed WTRU(s), then the WTRU may decode the received MD MU BA frame; otherwise, the WTRU may discard the MD MU BA frame. The WTRU may check the first dimension bitmap (i.e. MU bitmap 1922 in FIG. 19) and pay perform any of the following: if the bit corresponding to the WTRU in MU bitmap is equal to "1", it may indicate the WTRU in the MU group may receive an ACK/BA in the second-dimension bitmap, in which case the WTRU may check the $2^{nd}$ dimension bitmap (i.e. BA bitmap); and/or if the bit corresponding to the WTRU in MU bitmap is equal to "0", it may indicate that the packet from the WTRU was not successfully decoded, and thus there is no need for the WTRU to check its ACK/BA in the second dimension bitmap.

In further examples, the WTRU may check the second dimension bitmap (i.e. BA bitmap $1930_i$ in FIG. 19) to obtain its BA using any one or more of the following methods: in a case where the WTRU subfield has a fixed length MU BA info field, the WTRU may read its second-dimension BA bitmap based on the bit location in the MU Bitmap or pre-defined order; and/or in a case where the WTRU subfield has a variable length MU bit info field, the WTRU may perform a correlation with the pre-defined sequence or delimiter to determine the location and length of the second-dimension BA bitmap for this WTRU and then may read the bitmap.

Example MU BA methods may include broadcast MU BA procedures. In an example, a 64×16 bit uncompressed BA bitmap may be reusing the 16 bits that may be used for a MSDU fragment and using them for an indication of the WTRU identity for MU ACK aggregation. This method may support up to 64 MPDUs for each WTRU, and up to 16 WTRUs. The 16 bits in the BA bitmap may include, but is not limited to include, any of the following example elements: the MAC address of each WTRU for MU BA aggregation; and/or the CDMA code index or sequence applied to each WTRU's BA to support MU ACK aggregation.

In an example, an indication that a BA is an MU version BA may be indicated to MU WTRUs to distinguish from, for example, an uncompressed BA for a SU. This indication may be made in the frame control field using any one or more of the following techniques: a type may be defined, for example type=11, and the corresponding type description may be MU BA; and/or a subtype may be defined, for example under the control type (01), where the subtype may equal any value belonging to [0000, 0011].

Example MU BA methods may include broadcasted null data packet (NDP) MU BA procedures. According to an example, an NDP frame(s) may be used to acknowledge multiple users simultaneously. An NDP frame may contain a PLCP header only, and may not have a MAC body included. An NDP MU ACK frame may be broadcast to all users. The NDP MU ACK frame may carry information by rewriting the SIG field in the PLCP header. In an example, the SIG field may be transmitted over a basic sub-channel unit, and/or repeated on the rest of the sub-channels. In an example, the SIG field may be transmitted over the entire bandwidth. The SIG field may include, but is not limited to include, any of the following fields: an NDP MU ACK body field; an NDP MAC frame indication field; a CRC field; and/or a tail field for a convolutional code.

Figure 20:
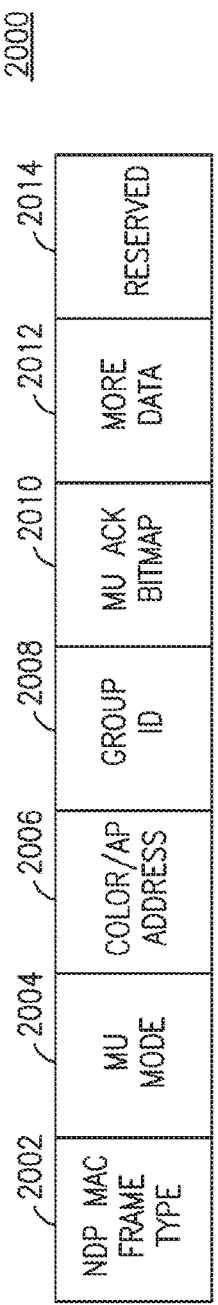
FIG. 20 shows a frame format of an example null data packet (NDP) MU ACK body field.

FIG. 20 shows a frame format for an example NDP MU ACK body field 2000. The NDP MU ACK body field 2000 may include, but is not limited to include, any of the following fields (subfields): an NDP MAC frame type field 2002; an MU mode field 2004; a color/AP address field 2006; a group ID field 2008; an MU ACK Bitmap field 2010; a more data field 2012; and/or reserved subfield(s) 2014.

The NDP MAC frame type subfield 2002 may indicate that the NDP MAC frame (i.e. full frame for the NDP MU ACK body field 2000) is an NDP MU ACK frame. The MU mode subfield 2004 may be used to indicate whether the transmission is for OFDMA, MU-MIMO and/or single user, for example. The color/AP address subfield 2006 may contain the identity of the AP. For example, color bits and/or the AP address may be used, where the AP address may be a (partial) BSSID of the AP. The group ID subfield 2008 may be used to signal the group ID. The MU ACK bitmap subfield 2010 may be used to carry the ACK information for each user (WTRU) or resource block. If the AP successfully decodes the packet in the NDP MAC frame for a certain WTRU or on a certain resource block, the AP may set a bit to "1" in the MU ACK bitmap 2010 for the corresponding WTRU (user) or resource block. Otherwise, the AP may set the bit to "0" in the MU ACK bitmap 2010 for the corresponding WTRU (user) or resource block.

In an example, the more data subfield 2012 may include a bitmap and each bit of the bitmap may correspond to a particular WTRU (user) or resource block. A bit in the bitmap may be set to "1" to indicate that the AP has more buffered data for the associated WTRU (user) or for a user on the associated resource block. In another example, the MU ACK bitmap 2010 may be used to indicate that the transmission opportunity (TXOP) may be extended and a DL transmission may follow the NDP MU ACK frame. In another example, the more data subfield 2012 may be a bit, which may be used to indicate that a DL transmission to the same group of WTRUs may follow.

Example MU BA methods may include broadcasted and/or dedicated NDP MU BA procedures. In an example method, an NDP frame may be used to acknowledge multiple users simultaneously. An NDP frame may have a PLCP header only and no MAC body included. For example, the MAC information may be carried in a PLCP header in a SIG-A and/or SIG-B field. In an example, an NDP MAC frame indication may be included in a SIG field, and the SIG field(s) may be overwritten to carry the NDP MAC frame indication.

Figure 21:
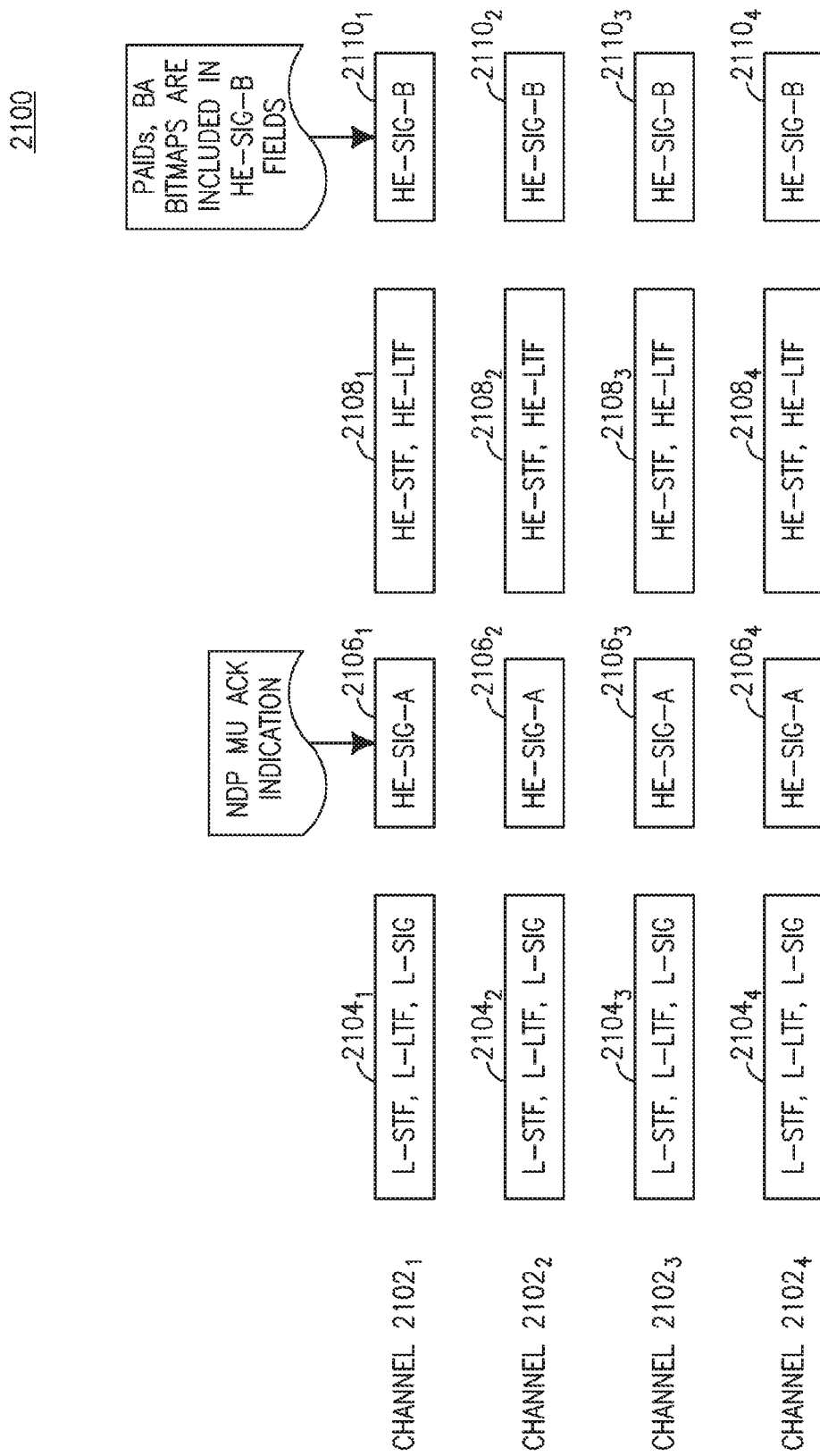
FIG. 21 shows a frame format of an example NDP MU BA header.

FIG. 21 shows a frame format for an example NDP MU BA header 2100. The example of FIG. 21 may use four channels or sub-channels $2102_1 \ldots 2102_4$. Any or all of the fields shown in FIG. 21 may be part of a PLCP header, for example. In the NDP MU BA header 2100, the SIG fields may be divided into a common part (e.g. broadcast part) and a user-specific part (e.g. a dedicated part). In the example shown in FIG. 21, HE-SIG-A field(s) $2106_1 \ldots 2106_4$ may be the common part and HE-SIG-B field(s) $2110_1 \ldots 2110_4$ may be the user-specific part.

L-STF, L-LTF and L-SIG fields $2104_1 \ldots 2104_4$ may be backward compatible. HE-SIG-A fields $2106_1 \ldots 2106_4$ and HE-SIG-B fields $2110_1 \ldots 2110_4$ may be PHY header(s), and may carry PHY layer related signaling information, and/or may be (partially) overwritten by MU BA information when used in an NDP MU frame. HE-SIG-A field(s) $2106_1 \ldots 2106_4$ may be transmitted over basic sub-channel(s) $2102_1$ (e.g. 20 MHz if the entire channel bandwidth is 80 MHz), and repeated on the rest of sub-channels $2102_2 \ldots 2102_4$. HE-SIG-A field(s) $2106_1 \ldots 2106_4$ may include NDP MU ACK indication(s). HE-STF, HE-LTF fields $2108_1 \ldots 2108_4$ may be training fields for HE packet(s). HE-SIG-B fields $2110_1 \ldots 2110_4$ may include, but are not limited to include, any of the following information: BA bitmaps; and/or partial AID(s) (PAID(s)), where an AID may be an association ID assigned by the AP when a WTRU performs association with the AP, and a PAID may be a compressed AID.

FIG. 22 shows a frame format for an example HE-SIG-A field 2200 (e.g., the HE-SIG-A field(s) $2106_1 \ldots 2106_4$ shown in FIG. 21). The HE-SIG-A field 2200 may include, but is not limited to include, any of the following: an NDP indicator field 2202; an NDP MAC frame type field 2204; an MU mode field 2206; an AP address field 2208; a duration field 2210; a bandwidth (BW) field 2212; a more data field 2214; an NDP SIG-B present field 2216; and/or reserved field(s) 2218.

The NDP indicator field 2202 (e.g. an NDP MU ACK indication) may indicate a NDP control MAC frame. With this indication, the HE-SIG-A field may be overwritten. The NDP MAC frame type field 2204 may be used to indicate the NDP MU BA frame. The MU mode field 2206 may be used to indicate the MU transmission mode, which may be SU, MU-MIMO and/or OFDMA, for example. The AP address field 2208 may be a (partial) BSSID of the transmitting AP, or another type of AP address. The duration field 2210 may be used to indicate the duration of the transmissions. The BW field 2212 may be used to indicate the bandwidth of the NDP MU BA frame. The more data field 2214 may be used to signal whether the AP has more data for the group of WTRUs. The NDP SIG-B present field 2216 may be used to indicate that an NDP-SIG-B field may follow (e.g. 1 bit). Other fields, such as a tail or CRC may be presented, although not shown.

FIG. 23 shows a frame format for an example HE-SIG-B field 2300 (e.g., the HE-SIG-B field(s) $2110_1 \ldots 2110_4$ shown in FIG. 21). An HE-SIG-B field 2300 may be presented when the NDP SIG-B present field in HE-SIG-A is set to 1, for example (as described in FIG. 22). HE-SIG-B field 2300 may be sub-channel dedicated or user dedicated. For example, with OFDMA, each sub-channel may carry its own HE-SIG-B field (e.g., the HE-SIG-B field(s) $2110_1 \ldots 2110_4$ on sub-channels $2102_1 \ldots 2102_4$ shown in FIG. 21).

Each HE-SIG-B field 2300 may include, but is not limited to include, any of the following information: PAID field 2302 may be a partial association identity (AID) of a receiving WTRU, and be another type of address such as compressed address and/or full address; ACK field 2304 may be used to carry acknowledgement (e.g., in the case of BA, it may be a bitmap; and/or reserved field(s) 2306.

In an example, the HE-SIG-A field(s) and HE-SIG-B field(s) may use different modulation schemes with different FFT sizes. In another example, some fields defined in the HE-SIG-A field, as described above, may be carried in the HE-SIG-B field, and vice versa.

In an example, any of the techniques for UL ACK aggregation described above may be used for DL ACK aggregation and/or UL MU transmission. In another example, UL ACK aggregation described herein may be used for DL ACK aggregation in combination with a header designed for DL ACK MU aggregation for UL MU transmission. FIG. 24 shows a frame format for an example DL ACK MU aggregation header 2400. The DL ACK MU aggregation header 2400 may include, but is not limited to include, any of the following fields: STF field 2402; LTF fields $2404_1 \ldots 2404_n$; SIG fields $2406_1 \ldots 2406_n$; and ACK fields $2408_1 \ldots 2408_n$, where the ACK fields $2408_1 \ldots 2408_n$ may be aggregated using any of the techniques for UL aggregation described herein. The use of the DL ACK MU aggregation header 2400 may reduce the common signaling overhead while enabling the aggregation of WTRU-specific headers and ACKs in a DL ACK MU frame, for example.

Example techniques may be used for reusing a Multi-TID BA for MU BA. The multi-TID BA frame format may be used for multi-WTRU BA/ACK transmission, for example in IEEE 802.11ax. Techniques are described herein for reusing the multi-TID BA frame format for MU (multi-WTRU) BA/ACK transmission.

In an example, the RA field may contain a receiver MAC address. With MU BA, the RA field may be redefined or reinterpreted because multiple receivers may be involved. The RA field may be designed using, but not limited to, any one or more of the following methods. In an example, the RA field may carry the group ID, which may be combined with (partial) AID to identify the intended receiver of the BA information field of multi-WTRUs. The (partial) AID may be present in a WTRU subfield of an MU BA info field, for example. In another example, the (partial) AID may be present in an MU BA control field such as an MU bitmap field and/or a reserved subfield.

In another example, the RA may be the MAC address or AID of the first (or the last) WTRU of the MU BA information field. It may be used to derive the address or AID of each WTRU carried in MU BA info field by a pre-defined rule. In another example, the RA may be reinterpreted as an AID for multiple WTRUs. For example, a 48-bit RA may support three WTRUs with 16-bit AID each. In another example, a 48-bit RA may support four WTRUs with 12-bit AID each. In another example, a 48-bit RA may use the first M bits to indicate the group ID, and the next 48-M bits to indicate a (partial) AID for multiple WTRUs. In another example, the RA may present nothing, and/or may be filled with a pre-defined sequence. The new AID present for each WTRU may be present in each WTRU subfield to be uniquely addressed.

In another example, the MD MU BA frame may contain only one BA info field, and the RA field value may be the address of the WTRU. In another example, if the MD MU BA frame contains more than one BA info field, the RA field value may be a group address. The group address may be a MAC address that has the group bit equal to 1. The group address may be reserved by the BSS and assigned to certain WTRUs by the BSS, for example.

Examples mechanisms and methods for MU BA signaling are described further herein. In an example, the MU BA frame may be signaled in the frame to identify it as an MU BA frame, using, but not limited to, any one or more of the following techniques. In an example, MU BA may be signaled using type, and/or subtype in the frame control field. In another example, MU BA may be signaled using the combination of the Multi-TID field, the compressed bitmap field and/or the GCR subfields in the BAR control field. For example, [Multi-TID, Compressed Bitmap, GCR]=[1,1,1] may be used to indicate an MU BA frame.

In an example, the BA information field may be repeated for each user (WTRU). The number of BA information fields (or the number of intended receivers/WTRUs of the MU BA frame) included in the MU BA frame may be signaled, for example using, but not limited to, any one or more of the following approaches: using TID_Info subfield in BA control field, where TID_Info subfield may be reinterpreted as the number of BA information fields; and/or using reserved bits in BA control field to signal the number of BA information fields.

Example mechanisms include suing partial AID in a BA information field. In an example, 11 bits in a per-TID info subfield of the BA information field may be used to carry an MU BA partial AID of the receiver (e.g. WTRU). The MU BA partial AID may be defined using, for example, the following definitions: (dec(AID[0:10])+dec(BSSID[44:47] ⊕BSSID[40:43])*$2^5$)mod $2^9$; and/or AID[0:10].

A variable length BA information field may be designed using any of the following example techniques. The length of the BA information field may be variable because ACK and BA may be supported. The procedures described herein may be used by the receiver (e.g. WTRU) to identify the BA information.

Figure 25:
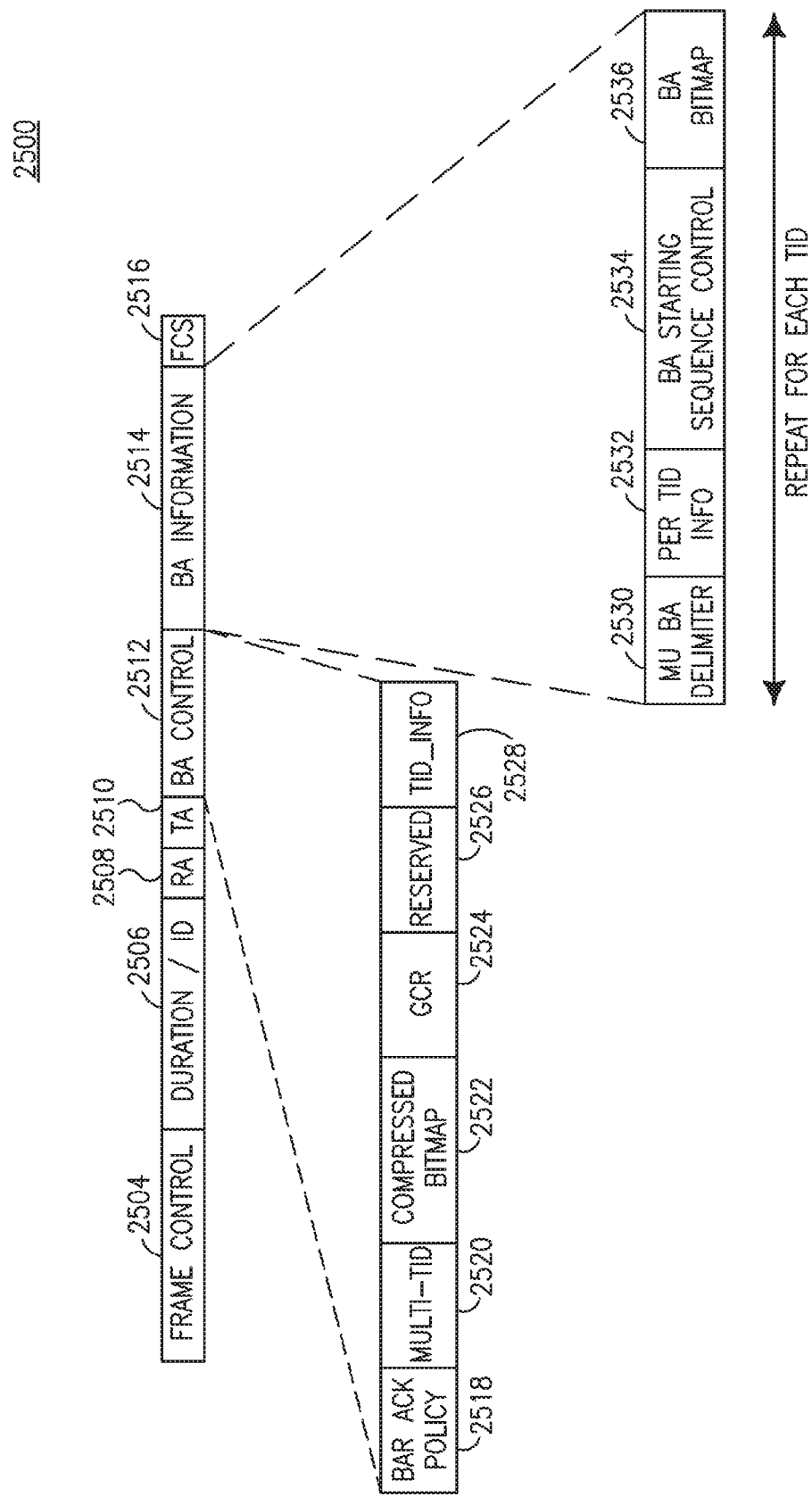
FIG. 25 shows a frame format of an example MU BA control frame.

FIG. 25 shows a frame format for an example MU BA control frame 2500. MU BA control frame 2500 may include, but is not limited to, include, any of the following: a frame control field 2504; a duration and/or ID field 2506; an RA field 2508; a TA field 2510; a BA control field 2512; a variable length BA information field 2514; and/or an FCS 2516. The BA control field 2512 may include, but is not limited to include, any of the following subfields: a BAR ACK policy field 2518; a multi-TID field 2520; a compressed bitmap field 2522; a GCR field 2524; a reserved field(s) 2526 (e.g., bits B4 to B11); and/or a TID_INFO field 2528.

The variable length BA information field 2514 may include information that is repeated for each TID. The repeated information in the BA information field 2514 may include, but is not limited to include, any of the following: an MU BA delimiter field 2530; a per-TID information field 2532; a BA SSC field 2534; and/or a BA bitmap field 2536.

As shown in FIG. 25, a MU BA delimiter subfield 2530 may be prepended to each BA information field 2514 (and repeated for each TID). The MU BA delimiter field 2530 may contain a sequence that may specify the boundary between BA information. The detailed MU BA delimiter 2530 design may use, but is not limited to, any one or more of the following example methods. In an example method, a universal sequence or signature may be specified or predetermined and may be used to detect the boundary of a BA info field by the receivers. The MU BA Delimiter subfield may include, but is not limited to, any of the following: the BA/ACK length (or BA info length) for the receiver (WTRU); and/or a CRC. In another example method, a WTRU (user) specified sequence or signature may be used. Each receiver may scan its own sequence or signature to obtain its BA information. The MU BA Delimiter subfield may include, but is not limited to, any of the following: the BA/ACK length (or BA info length) for the receiver (WTRU); and/or a CRC.

Referring back to the example in FIG. 25, the MU BA delimiter subfield 2530 is shown to be followed by a per-TID info subfield 2532. In an example, the MU BA delimiter subfield 2530 and the per-TID info subfield 2532 may be combined, and the combined subfield may include, but is not limited to include, any of the following information: a sequence/signature that may defining the boundary of MU BA information field; a BA/ACK indication that may indicate a BA or a normal ACK in the BA information field; a receiver ID (e.g. partial AID and/or AID); a BA/ACK length that may indicate the length of the BA information for the WTRU (user); and/or a CRC field.

Example mechanisms and methods may be used to indicate a multi-WTRU (MU) BA frame. For example, in order to differentiate between a Multi-WTRU BA frame and Multi-TID BA frame, an indication may be added to the frame to indicate that it is a multi-WTRU BA. Example indication techniques may include, but are not limited to include, any of the following approaches: an indication may be included in a frame control field, for example, by defining a type and/or subtype; a BA type or subtype may be used for indication, where the RA field may be revisited after detecting the frame is a Multi-WTRU BA frame (may be signaled later in the frame); and/or a GCR field may be used to signal the multi-WTRU BA.

In an example, a BAR/BA protocol may be used for a multi-WTRU BA frame and may be used with any of the MA BA mechanisms and procedures described herein. Reusing multi-TID BA for Multi-WTRU BA/ACK may include redefining the BAR/BA protocol. An ACK policy may be used for multi-WTRUs within this multi-WTRU BA frame. For example, some users (WTRUs) may need immediate BA, and some users may permit delayed BA. In another example, all WTRUs within a multi-WTRU BA frame may need immediate and/or delay BA.

Mechanisms and procedures may be used for short packet MU aggregation in the DL, UL, and/or peer-to-peer transmissions. Short packet MU aggregation may include, but is not limited to include, any of the following: short data packet MU aggregation; and/or MU aggregation for short data packet and control frames such as ACK or short ACK.

The IEEE 802.11n and 802.11ac specifications may include aggregated MPDUs for SU aggregation within the same burst. In MU scenarios, where all the users (WTRUs) have small packets, the packet data units that may be aggregated into short bursts from multiple WTRUs may be aggregated in one PPDU. This approach may be especially useful as a MAC level change for MU aggregation of IEEE 802.11ax transmissions in high-density environments. Moreover, any of the techniques for MU ACK aggregation, as described herein, may be applicable to short data packet MU aggregation.

In an example, short packets of different types addressed to multiple users may be aggregated. Short packet MU aggregation for DL, UL or P2P transmissions may include, but is not limited to include, any of the following information: a packet header that may indicate that the data frame is a MU aggregated data frame, as indicated for example in the PHY header and/or MAC header; and/or a packet header may indicate a number of users to whom the frame is addressed. The packet header may be structured using any of the following example approaches, which may be combined in one transmission or in separate transmissions: in an example case where the frames for each user are different, the packet header of each of several frames may indicate the address of each user, the length of frame and/or unique frame data (e.g., {A1, L1, D1}, {A2, L2, D2} . . . ); and/or in an example case where the frames for each user are identical, the packet header of each frame may indicate the address of each user, and common frame data (e.g., {A1, A2, Dcommon}).

Figure 26:
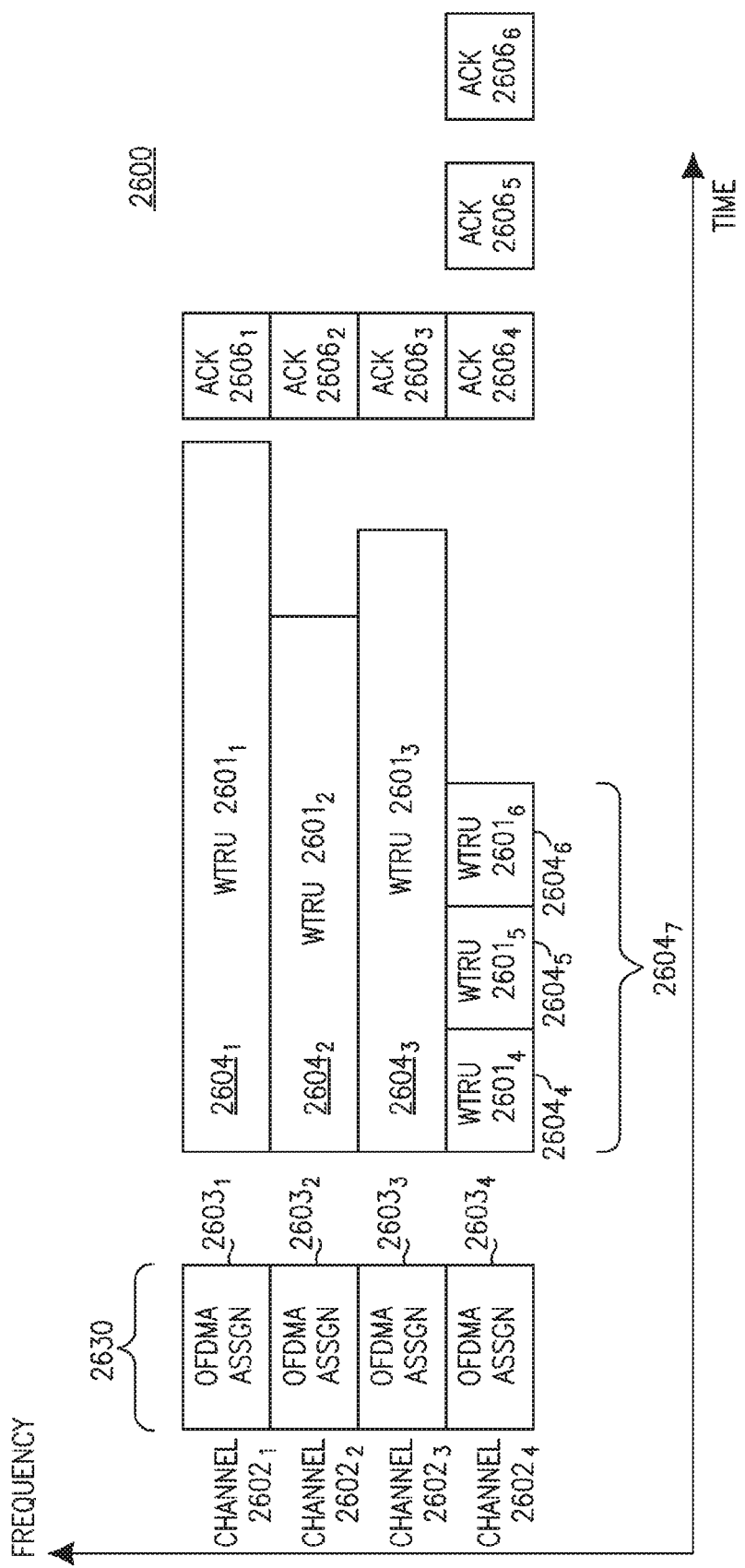
FIG. 26 shows a message diagram of an example MU aggregation procedure.

FIG. 26 shows a message diagram for an example MU aggregation procedure 2600 for short packets with OFDMA. The MU aggregation procedure 2600 may be used to transmit short data packets to multiple users. In the example of FIG. 26, an AP may have a large amount of data $2604_1$, $2604_2$ and $2604_3$ to transmit to respective WTRUs $2601_1$, $2601_2$, and $2601_3$. The AP may have a small amount of data $2604_4$, $2604_5$ and $2604_6$ to transmit to respective WTRUs $2601_4$, $2601_5$, and $2601_6$.

The AP may set up a DL OFDMA transmission with the following channelization: WTRU $2601_1$ on channel $2602_1$; WTRU $2601_2$ on channel $2602_2$; WTRU $2601_3$ on channel $2602_3$; and WTRUs $2601_4$, $2601_5$, and $2601_6$ on channel $2602_4$. An OFDMA assignment frame 2630 (spanning channels $2602_1$ . . . $2602_4$ and including OFDMA assignment frames $2603_1$ . . . $2603_4$) may be a control frame that may indicate the channelization that is sent to the WTRUs $2601_1$, $2601_2$, and $2601_3$ by the AP. For example, WTRUs $2601_4$, $2601_5$, and $2601_6$ may decode channel $2602_4$ with the MU aggregated frame $2604_7$ to determine access their data.

The WTRUs $2601_1$ . . . $2601_6$ may receive respective data packets $2604_1$ . . . $2604_6$. In an example, data transmissions $2604_1$ . . . $2604_6$ may include dummy data and/or packet extensions so that all channels are occupied equally for the duration of the transmission. On successful decoding of the respective packets $2604_1$ . . . $2604_6$, the WTRUs $2601_1$ . . . $2601_6$ may send back respective UL ACKs $2606_1$ . . . $2606_6$. The WTRUs $2601_4$, $2601_5$, and $2601_6$ may send ACKs $2606_4$, $2606_5$, and $2606_6$ in the order that the data is sent. The OFDMA assignment frame $2603_1$ . . . $2603_4$ may set the time for transmission to cover all three ACKs $2606_4$, $2606_5$, and $2606_6$ so that other WTRUs $2601_4$, $2601_5$, and $2601_6$ may set their network allocation vectors (NAVs) appropriately. In another example, the ACKs $2606_4$, $2606_5$, and $2606_6$ may be sent simultaneously, using for example an orthogonal code or sequence to enable separation.

Figure 27:
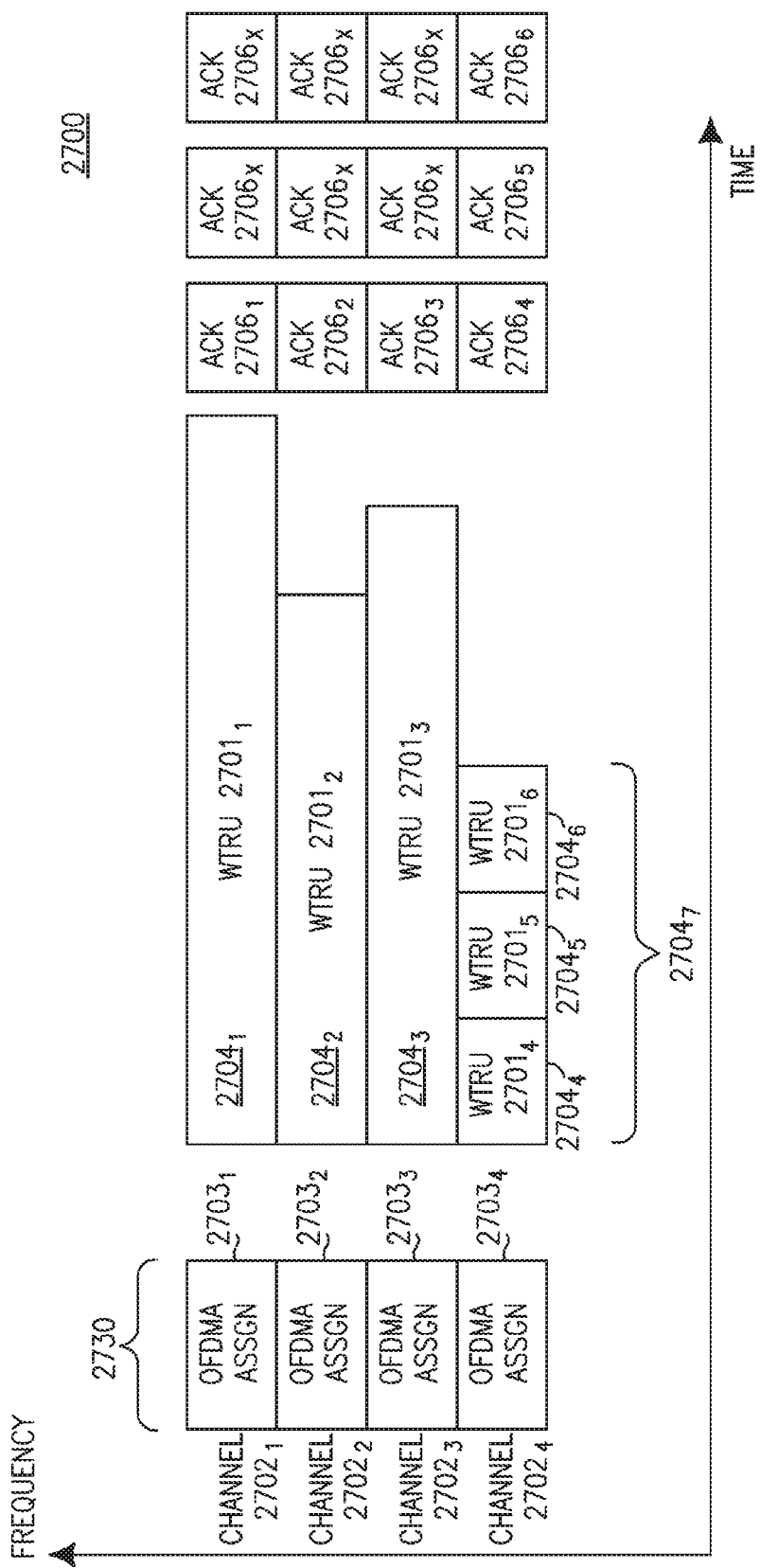
FIG. 27 shows a message diagram of another example MU aggregation procedure.

FIG. 27 shows a message diagram for another example MU aggregation procedure 2700 for short packets with OFDMA. FIG. 27 shows an identical scenario to FIG. 26, and in addition the WTRUs $2701_1$, $2701_2$, and $2701_3$ that do not transmit multi-user PPDUs may send multiple dummy ACKs 2706x to ensure that the channels $2702_1$, $2702_2$, and $2702_3$ stay occupied for the entire duration of the OFDMA TXOP.

Figure 28:
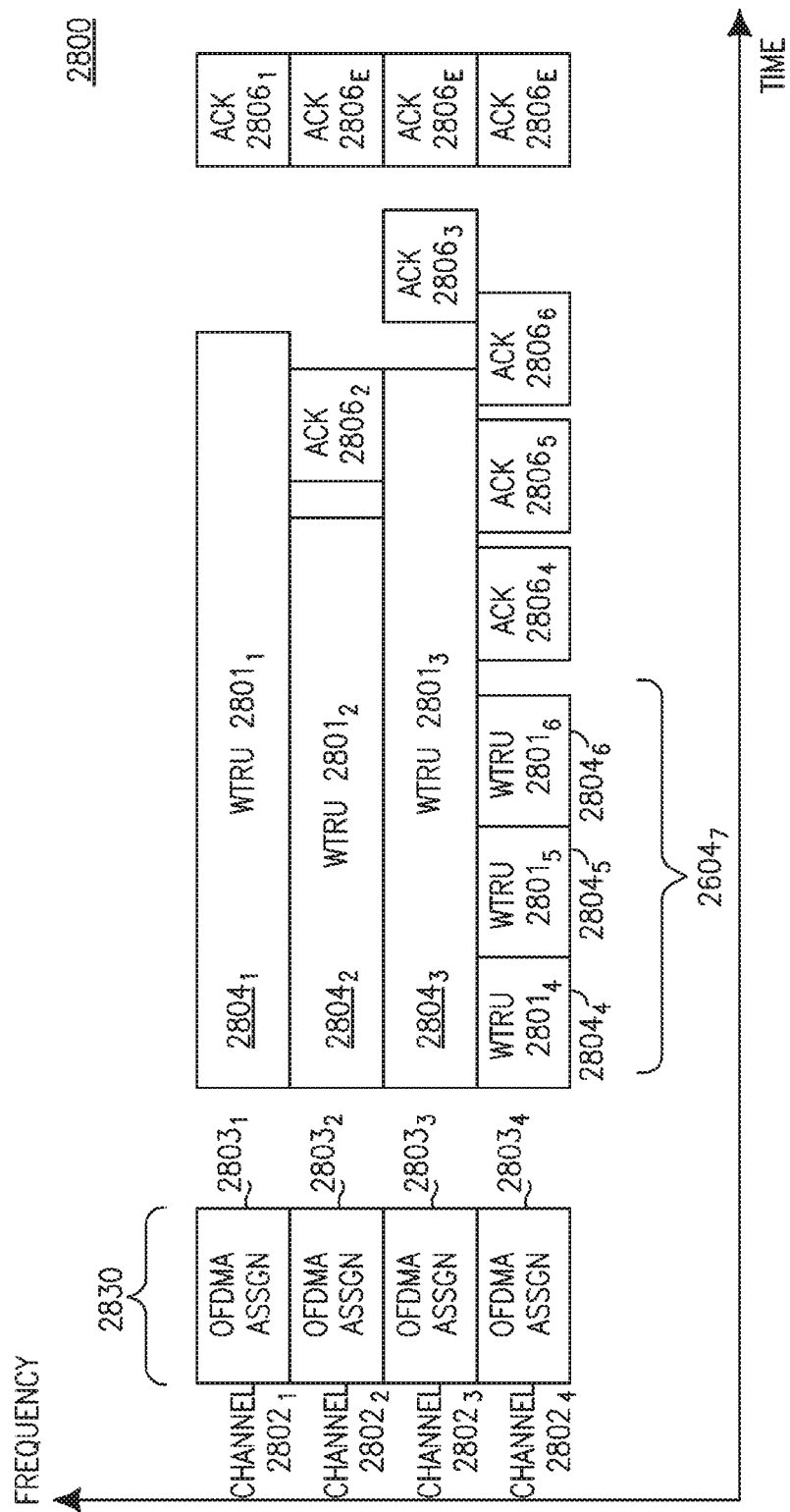
FIG. 28 shows a message diagram of another example MU aggregation procedure.

FIG. 28 shows a message diagram for another example MU aggregation procedure 2800. In the example of FIG. 28, the AP and/or the WTRUs $2801_1$ . . . $2801_6$ may have simultaneous transmit-receive (STR) capability (e.g., full-duplex radio or transceiver). FIG. 28 shows an identical scenario to FIG. 26, however because of the STR capabilities, the ACKs $2806_1$ . . . $2806_6$ may be sent immediately after the respective packet transmissions $2604_1$ . . . $2604_6$ are over. Additionally, ACK-End (ACK-e) frames $2806_E$ may be sent at the end of the whole transmission to indicate when the total OFDMA transmission is over.

In another example, MU ACKs may be aggregated to create a MU/A-MPDU Block ACK or two dimensional (2D) block ACK.

Example procedures may be used to optimize the transmission of DL block ACKs when UL MU transmission occurs. Such example procedures may include, but or not limited to, any of the following procedures. In an example, the packet header may indicate that the block ACK is a multiple-WTRU block ACK. In another example, the packet header may indicate the address of the recipient WTRUs. For example, a group ID may indicate that addresses all the WTRUs in the UL MU transmission. In another example, a bit-map based on the positions of the WTRUs in the MU transmission may identify the WTRUs that successfully transmit, such that WTRUs that transmit successfully may be set to 1 and vice versa; multiple receive addresses may be used. In another example, to limit overhead, the block ACK may use a PAID or a group of PAIDs corresponding to the WTRUs to which the block ACK is being sent.

In another example, the packet header may indicate block ACK size to allow for acknowledgement of A-MPDU frames. For example, a separate size may be indicated for each WTRU. In another example, a variable size based on maximum A-MPDU may be transmitted by the WTRUs. In another example, a fixed size based on maximum A-MPDU size specified in standard.

An example procedure to reduce the overhead of a DL block ACK in response to an UL MU transmission is described herein. In an example, WTRU1, WTRU2, WTRU3 and WTRU4 may transmit data to an AP in an uplink MU transmission that may be UL-OFDMA or UL MU-MIMO. The AP may send an optimized block ACK to the WTRUs. Procedures may be used in the case that the information from certain WTRUs requires additional processing time.

In this example, WTRU1 and WTRU2 may be successful, while WTRU3 and WTRU4 may need additional processing time. The AP may send a simultaneous ACK to WTRU1 and WTRU2. The AP may also send a simultaneous delayed ACK transmission to WTRU3 and WTRU4. The ACKs may be transmitted at the same time. The AP may send a downlink OFDMA transmission to WTRU5, WTRU6, and WTRU7 on sub-channel 1, 2 and 3, for example in the next or a subsequent transmission. The AP may send a multi-user aggregated ACK to WTRU3 and 4 at the same time on a sub-channel, for example.

Example mechanisms and methods for MU aggregation for short packets with OFDMA may use a narrow center frequency. In an example, ACKs for either OFDMA or MU-MIMO transmissions on sub-channels may be sent on an associated narrow center channel, sub-channel or resource unit (RU).

Figure 29:
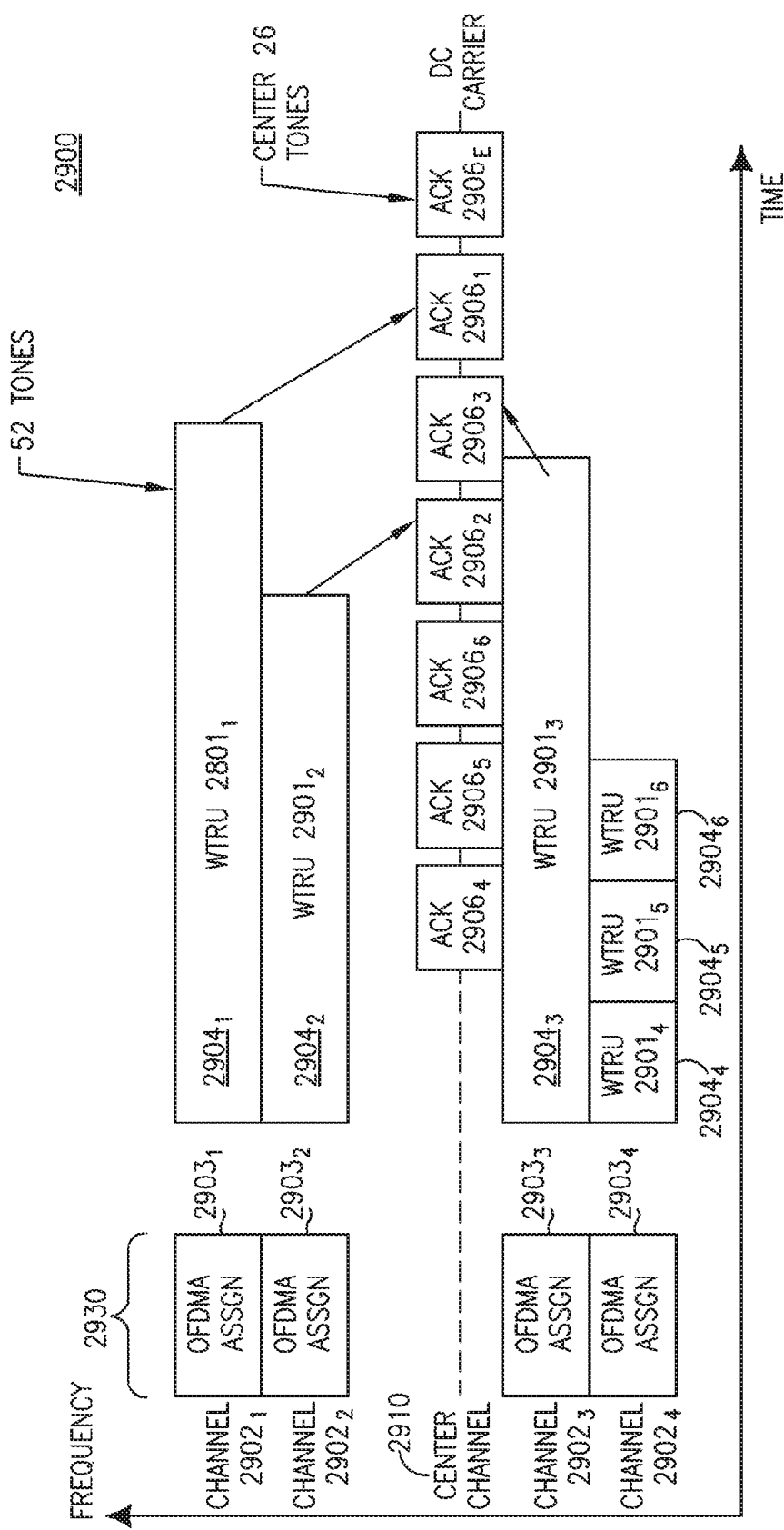
FIG. 29 shows a message diagram of an example MU aggregation procedure for short packets with OFDMA and a narrow center channel.

FIG. 29 shows a message diagram of an example MU aggregation procedure 2900 for short packets with OFDMA and a narrow center channel 2901. As in FIGS. 26-28, an AP may have a large amount of data $2904_1$, $2904_2$ and $2904_3$ to transmit to respective WTRUs $2601_1$, $2601_2$, and $2601_3$. The AP may have a small amount of data $2904_4$, $2904_5$ and $2904_6$ to transmit to respective WTRUs $2901_4$, $2901_5$, and $2901_6$. In the example of FIG. 29, the center tones (e.g. center 26 tones) RU or sub-channel 2910 may be used to send any of ACKs $2906_1 \ldots 2906_6$ and/or ACK-E 2906E associated with corresponding WTRUs $2901_1 \ldots 2901_6$ transmitted over channels $2902_1 \ldots 2902_4$. This configuration may have the additional advantage that if there are no data packets to be sent, the center channel 2910 may still be used for the transmission of control packets (e.g., NDP's, or ACK's) without the need to modify the RF configuration for the control packet transmissions.

Figure 30:
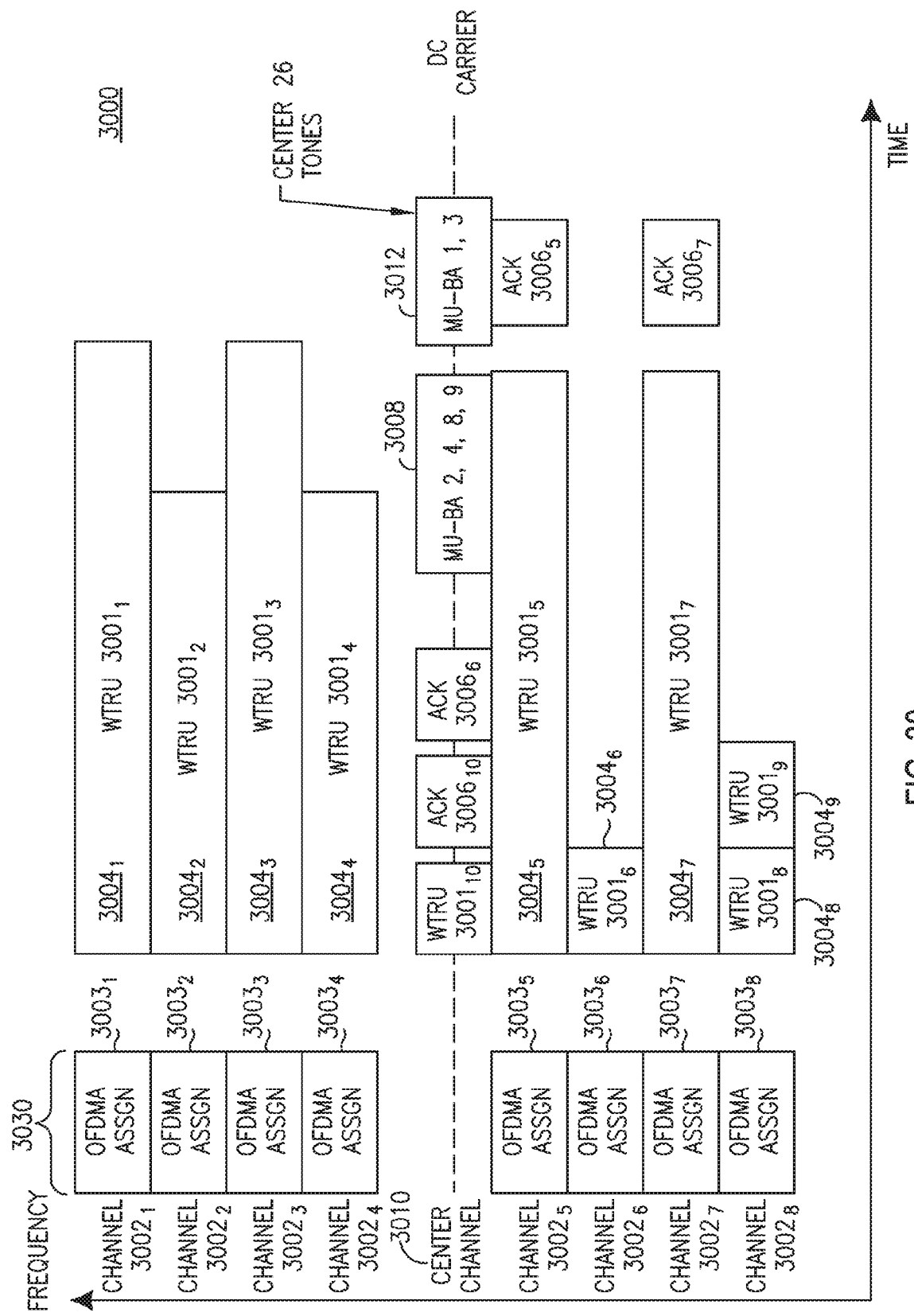
FIG. 30 shows a message diagram of another example MU aggregation procedure.

In another example, the allocation of packets and their respective ACKs may use a finer resource utilization than that shown in FIG. 29. FIG. 30 shows a message diagram of another example MU aggregation procedure 3000. In FIG. 30, resources for ten WTRUs $3001_1 \ldots 3001_{10}$ are accommodated. In this example the individual channels $3002_1 \ldots 3002_8$ may utilize 26 tones for each WTRU $3001_1 \ldots 3001_{10}$ transmission $3004_1 \ldots 3004_{10}$ and the associated ACKs $3006_1 \ldots 3006_{10}$ may occur on the center channel 3010, and/or on the WTRU's assigned sub-channel $3002_1 \ldots 3002_8$. The center channel 3010 may facilitate assignment to one or more WTRUs $3001_1 \ldots 3001_{10}$ for short packets, which may require lower BW transmissions (e.g., their associated ACKs in response to the opposite direction of the data transmission). MU-BA frame 3008 may serve as a multi-user block acknowledgment for WTRUs $3001_2$, $3001_4$, $3001_8$, and $3001_9$ and MU-BA frame 3012 may serve as a multi-user block acknowledgment for WTRUs $3001_1$ and $3001_3$.

Example procedures for bandwidth signaling using RTS and CTS may be extended to allow enhanced small data packet transmissions. In the same manner that multiple duplicated RTS channels may be utilized for subsequent duplicated packet transmissions, such procedures may be extended to allow multiple transmissions of small data packets while maintaining a low overhead.

An example procedure for bandwidth signaling using RTS and CTS for enhanced small data packet transmissions over two or more channels is described herein. In an example, the channels may be 5 Mhz, 20 Mhz, or another channel bandwidth. The procedure is may be referred to as a non-HT duplicate short data frame transmission procedure.

In an example, the AP may transmit a frame on the primary channel (e.g., 5 MHz or 20 MHz as in various IEEE 802.11 standards) for backwards compatibility, and the short packet transmission may be allocated to the secondary channels. In another example, instead of the AP transmitting a frame on the primary channel for backwards compatibility, the AP may setup a non-HT duplicate frame allocation on the available channels (e.g., up to 80 MHz) for another short packet transmission.

In an example, multiple parallel short data packets may then be sent on multiple parallel channels. The short data packets may have an indication in the MAC header or the SIG field for example, indicating that the short data packets are being sent using a non-HT duplicate short data frame transmission. When a WTRU receives a non-HT duplicate short data frame with the non-HT duplicate indication, the WTRU may know to only send a single BA on the primary channel for all of the parallel received short data packets. In an example where all short data packets are non A-MPDU, the single BA may be reused or re-interpreted for the aggregated short data packets from MU instead of single user. In an example where one or more of the aggregated short data packets is A-MPDU, the single BA may be a two-dimensional BA as described above.

The example procedure for bandwidth signaling using RTS and CTS for enhanced small data packet transmissions may be extended to allow a combination of short and long data packets to be sent over multiple parallel channels. In an example, the AP may set up a non-HT duplicate frame allocation on the available channels (e.g., up to 80 MHz). Multiple parallel short data packets may be sent on multiple parallel channels. The short data packets may have an indication in the MAC header or the SIG field for example, indicating that they are being sent using a non-HT duplicate short data frame transmission.

In an example, a long data packet may be sent only on the primary channel(s) by not including the non-HT duplicate short data frame indication in either the MAC header, or the SIG field. In an example where a WTRU receives a non-HT duplicate short data frame with the non-HT duplicate indication, the WTRU may only send a single BA on the primary channel(s) for all of the parallel received short data packets, and another ACK or normal BA for the long data packet received on the primary channel (s). In an example where all short data packets are non A-MPDU, the single BA may be reused or re-interpreted for the aggregated short data packets from MU instead of single user. In an example where one or more of the aggregated short data packets is A-MPDU, the single BA may be two-dimensional BA as described above.

Although the approaches described herein may be described with respect to IEEE 802.11 protocols, they may be applicable to other wireless systems. Wherever a type of IFS is used, any other time interval may be used.

Although features and elements are described above in particular combinations, one of ordinary skill in the art will appreciate that each feature or element can be used alone without the other features or in any combination with or without the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A station (STA) configured for multi-user (MU) communications, the STA comprising:
    a receiver configured to receive a control frame, wherein the control frame includes uplink (UL) MU response scheduling information for transmission of a block acknowledgement (BA) by the STA and BAs by a group of STAs; and
    a transmitter configured to transmit the BA, wherein the transmission of the BA occurs a SIFS interval after the received control frame as part of an MU transmission.

2. The STA of claim 1, wherein:
the receiver is further configured to receive a DL MU transmission, wherein the DL MU transmission is one of a DL MU multi-input-multi-output (MIMO) transmission or a DL orthogonal frequency division multiple access (OFDMA) transmission.

3. The STA of claim 1, wherein the control frame includes at least one of the following information: a number of STAs scheduled to feedback an acknowledgment, an indication of the group of STAs scheduled to feedback an acknowledgment, a resource unit indication for each STA for the transmission of BAs, block acknowledgment request (BAR) control and BAR information for each scheduled STA, or an indication regarding permissible aggregation of BAs and other packets.

4. The STA of claim 1, wherein:
the receiver is further configured to receive a data physical layer convergence protocol (PLCP) protocol data unit (PPDU), wherein the BA acknowledges the data PPDU.

5. The STA of claim 4, wherein the data PPDU is transmitted as part of a plurality of data PPDUs that are transmitted simultaneously over a plurality of respective resource units.

6. A method, performed by a station (STA), for multi-user (MU) communications, the method comprising:
receiving a control frame, wherein the control frame includes uplink (UL) MU response scheduling information for transmission of a block acknowledgement (BA) by the STA and BAs by a group of STAs; and
transmitting a BA, wherein the transmission of the BA occurs a SIFS interval after the received control frame as part of an MU transmission.

7. The method of claim 6, further comprising:
receiving a DL MU transmission, wherein the DL MU transmission is one of a DL MU multi-input-multi-output (MIMO) transmission or DL orthogonal frequency division multiple access (OFDMA) transmission.

8. The method of claim 6, wherein the control frame includes at least one of the following information: a number of STAs scheduled to feedback an acknowledgment, an indication of the group of STAs scheduled to feedback an acknowledgment, a resource unit indication for each STA for the feedback of the BAs, block acknowledgment request (BAR) control and BAR information for each scheduled STA, or an indication regarding permissible aggregation of BAs and other packets.

9. The method of claim 6, further comprising:
receiving a data physical layer convergence protocol (PLCP) protocol data unit (PPDU), wherein the BA acknowledges the data PPDU.

10. The method of claim 9, wherein the data PPDU is transmitted as part of a plurality of data PPDUs that are transmitted simultaneously over a plurality of respective resource units.

11. An access point (AP) configured for multi-user (MU) communications, the AP comprising:
a transmitter configured to transmit a control frame, wherein the control frame includes uplink (UL) MU response scheduling information for transmission of a block acknowledgment (BA) by a group of STAs;
the transmitter further configured to transmit a data physical layer convergence protocol (PLCP) protocol data unit (PPDU); and
a receiver configured to receive the BA, wherein the BA is received at least a short interframe spacing (SIFS) interval after the transmitted control frame as part of an MU BA transmission, and wherein the BA is associated with the data PPDU.

12. The AP of claim 11, wherein the transmitter is further configured to transmit a DL MU transmission, wherein the DL MU transmission is one of a DL MU multi-input-multi-output (MIMO) transmission or a DL orthogonal frequency division multiple access (OFDMA) transmission.

13. The AP of claim 11, wherein the control frame further includes at least one of the following information: a number of STAs scheduled to feedback an acknowledgment, an indication of the group of STAs scheduled to feedback an acknowledgment, a resource unit indication for each STA for the transmission of BAs, block acknowledgment request (BAR) information for each scheduled STA, or an indication regarding permissible aggregation of BAs and other packets.

14. The AP of claim 11, wherein the data PPDU is part of a plurality of data PPDUs that are transmitted simultaneously over the plurality of respective resource units.

* * * * *